(12) United States Patent
Kye

(10) Patent No.: US 7,157,143 B2
(45) Date of Patent: Jan. 2, 2007

(54) TWO-COMPONENT EPOXY ADHESIVE FORMULATION FOR HIGH ELONGATION WITH LOW MODULUS

(75) Inventor: Jihong Kye, Troy, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/395,783

(22) Filed: Mar. 24, 2003

(65) Prior Publication Data
US 2004/0197563 A1 Oct. 7, 2004

(51) Int. Cl.
*B32B 27/38* (2006.01)
*B32B 15/08* (2006.01)
*C08L 63/00* (2006.01)

(52) U.S. Cl. ............... 428/416; 428/413; 428/414; 428/418; 523/400; 525/523; 525/524

(58) Field of Classification Search ............... 428/413, 428/414, 415, 416, 417, 418; 523/400, 440; 525/523, 524, 525
See application file for complete search history.

(56) References Cited

U.S. PATENT DOCUMENTS

| 4,383,060 A | 5/1983 | Dearlove et al. |
| 4,661,539 A | 4/1987 | Goel |
| 4,728,384 A | 3/1988 | Goel |
| 4,728,737 A | 3/1988 | Goel |
| 4,740,539 A | 4/1988 | Goel |
| 4,762,864 A | 8/1988 | Goel et al. |
| 5,019,608 A | 5/1991 | Shah |
| 5,426,169 A * | 6/1995 | Starner ............ 528/103 |
| 6,645,341 B1 * | 11/2003 | Gordon ............ 156/330 |
| 2004/0072927 A1 * | 4/2004 | Hachikian .......... 523/457 |

FOREIGN PATENT DOCUMENTS

| EP | 0 249 940 | 12/1987 |
| EP | 0 488 949 A2 | 6/1992 |
| EP | 0 527 706 A1 | 2/1993 |

OTHER PUBLICATIONS

Product literature for Hycar® RLP's, provided by Noveon, Inc.*
Product literature for Ancamine® 1767, provided by Air Products and Chemicals, Inc.*
Product literature for Cardolite® products, provided by Cardolite Corporation.*

* cited by examiner

*Primary Examiner*—Michael J. Feely
(74) *Attorney, Agent, or Firm*—Warn Hoffmann Miller & LaLone PC

(57) ABSTRACT

Two-component epoxy adhesive compositions, and methods of using the same, are described. The compositions include an epoxy resin component, including at least one epoxy resin and at least one flexibilizer present in the range of about 12 to about 16 weight percent, based on the total weight of the epoxy resin component, and an epoxy curative component, including at least one curing agent and at least one flexibilizer present in the range of about 55 to about 65 weight percent, based on the total weight of the epoxy curative component.

90 Claims, 5 Drawing Sheets

TWO-COMPONENT EPOXY ADHESIVE FORMULATION FOR HIGH ELONGATION WITH LOW MODULUS

FIELD OF THE INVENTION

The present invention relates generally to epoxy adhesives, and more particularly to new and improved two-component epoxy adhesive compositions having enhanced flexibility and elongation characteristics.

BACKGROUND OF THE INVENTION

Thermosetting polymers, such as epoxy adhesives (including two-component epoxy adhesives), have been used in various industries to bond one surface of a substrate to an adjacent surface of another substrate. Two-component epoxy adhesives typically include one or more epoxy resins that are selectively combined with one or more curing agents or hardeners, such as a variety of active hydrogen compounds including polyamines, polyacids, polymercaptans, polyphenols, polyamides and polyureas. Additional materials and additives, such as extenders, fillers, reinforcing agents, colorants (e.g., pigments or dyes), organic solvents, plasticizers, flexibilizers, tackifiers, diluents, adhesion promoters, thixotropic agents, rheological agents, and the like, may be incorporated into either of the two components, as is known in the art.

With respect to the automotive industry, two-component epoxy adhesives have been used to bond stamped metal parts together, as well as SMC (i.e., sheet molded compound) to SMC, or SMC to metal (e.g., steel) parts for automotive assembly purposes. Typical automotive applications of two-component epoxy adhesives can include the bonding of SMC parts such as doors, hoods, tailgates and body panels. Accordingly, the use of these two-component epoxy adhesives has enabled automotive manufacturers to reduce the weight of vehicles, as well as realize cost and labor savings by eliminating the need for other more expensive and complicated joining methods.

Examples of epoxy adhesive compositions, including two-component epoxy adhesive compositions, can be found with reference to U.S. Pat. No. 4,383,060 to Dearlove et al.; U.S. Pat. No. 4,661,539 to Goel, U.S. Pat. No. 4,728,384 to Goel; U.S. Pat. No. 4,728,737 to Goel; U.S. Pat. No. 4,740,539 to Goel; U.S. Pat. No. 4,762,864 to Goel et al., the specifications of all of which are incorporated herein by reference. Additionally, examples of epoxy adhesive compositions, including two-component epoxy adhesive compositions, can also be found with reference to European Patent Application Nos. 0 488 949 B1 to Behm et al. and 0 527 706 A1 to Wongkamolsesh, the entire specifications of which are incorporated herein by reference.

Unfortunately, conventional two-component epoxy adhesives do suffer from several drawbacks that preclude their widespread use as an automotive adhesive, especially with respect to bonding the components of exterior automotive panels together. The main problem is that, upon curing, two-component epoxy adhesives are very rigid (i.e., inflexible) and have poor contraction and elongation characteristics. Even conventional two-component epoxy adhesives that contain flexibilizers suffer from significant problems, such as poor cross-linking density and moisture sensitivity problems. All of these issues detract from the processability and usefulness of two-component epoxy adhesives, where a relatively high degree of flexibility and low moisture sensitivity are desirable.

Additionally, the use of conventional two-component epoxy adhesives have led to read through problems in the finished exterior automotive panel, especially those using SMC, thus detracting from the aesthetic appearance of the finished exterior automotive panel. This problem causes high defects rates in the finished exterior automotive panels and increases manufacturing costs.

Further, adhesive failure has occurred with conventional two-component epoxy adhesives, especially after exposure to elevated temperature, such as during hot water immersion. Accordingly, automotive manufacturers have resorted to using more expensive acrylic-based adhesives, especially for assembling and bonding exterior panels.

Therefore, there exists a need for effective and inexpensive two-component epoxy adhesive compositions that have improved flexibility and elongation characteristics and that are especially useful for bonding together the components of exterior automotive panels.

SUMMARY OF THE INVENTION

In accordance with the general teachings of the present invention, new and improved two-component epoxy adhesives, and methods for using the same, are provided.

The adhesive compositions of the present invention are preferably characterized as having enhanced flexibility and elongation characteristics, making them especially suitable for exterior automotive panel applications, especially where read-through problems are to be avoided. The adhesive compositions of the present invention preferably include an epoxy resin component and an epoxy curative component, wherein both components contain flexibilizers in amounts sufficient to impart the afore-mentioned enhanced flexibility and elongation characteristics to the cure adhesive compositions.

By the term "flexibilizer," as that term is used herein, it is meant any material having the ability to impart flexibility to either the epoxy resin component, the epoxy curative component and/or the cured adhesive composition of the present invention. Accordingly, flexibilizers include, without limitation, those materials that are conventionally thought to function as flexibilizers in their own right, other materials that contain additional materials conventionally thought to function as flexibilizers, as well as still other materials that, while not containing materials conventionally thought to function as flexibilizers, nonetheless possess flexibility-imparting properties.

By way of a non-limiting example, the epoxy resin component includes one or more flexibilizers in the range of about 12 to about 16 weight percent, based on the total weight of the epoxy resin component. By way of a non-limiting example, the epoxy curative component includes one or more flexibilizers in the range of about 55 to about 65 weight percent, based on the total weight of the epoxy resin component.

In accordance with a first embodiment of the present invention, a two-component epoxy adhesive composition is provided, comprising: (1) an epoxy resin component, comprising at least one epoxy resin, and at least one flexibilizer present in the range of about 12 to about 16 weight percent, based on the total weight of the epoxy resin component; and (2) an epoxy curative component, comprising at least one curing agent, and at least one flexibilizer present in the range of about 55 to about 65 weight percent, based on the total weight of the epoxy curative component.

In accordance with a second embodiment of the present invention, a two-component epoxy adhesive composition is provided, comprising: (1) an epoxy resin component, comprising at least one epoxy resin, and at least one flexibilizer present in the range of about 13 to about 15 weight percent, based on the total weight of the epoxy resin component; and (2) an epoxy curative component, comprising at least one curing agent, and at least one flexibilizer present in the range of about 57 to about 63 weight percent, based on the total weight of the epoxy curative component.

In accordance with a third embodiment of the present invention, a two-component epoxy adhesive composition is provided, comprising: (1) an epoxy resin component, comprising at least one epoxy resin, and at least one flexibilizer present in an amount equal to about 14 weight percent, based on the total weight of the epoxy resin component; and (2) an epoxy curative component, comprising at least one curing agent, and at least one flexibilizer present in an amount equal to about 60 weight percent, based on the total weight of the epoxy curative component.

In accordance with a fourth embodiment of the present invention, an automotive exterior panel system is provided, comprising: (1) a first panel member; (2) a second panel member; and (3) a two-component epoxy adhesive composition disposed therebetween, the composition comprising (a) an epoxy resin component, comprising at least one epoxy resin, and at least one flexibilizer present in the range of about 12 to about 16 weight percent, based on the total weight of the epoxy resin component; and (b) an epoxy curative component, comprising at least one curing agent, and at least one flexibilizer present in the range of about 55 to about 65 weight percent, based on the total weight of the epoxy curative component.

In accordance with an fifth embodiment of the present invention, a method for forming an automotive exterior panel system is provided, comprising the steps of: (1) providing a first panel member; (2) providing a second panel member; and (3) applying a two-component epoxy adhesive composition therebetween, the composition comprising: (a) an epoxy resin component, comprising at least one epoxy resin, and at least one flexibilizer present in the range of about 12 to about 16 weight percent, based on the total weight of the epoxy resin component; and (b) an epoxy curative component, comprising at least one curing agent, and at least one flexibilizer present in the range of about 55 to about 65 weight percent, based on the total weight of the epoxy curative component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

Figure 1:
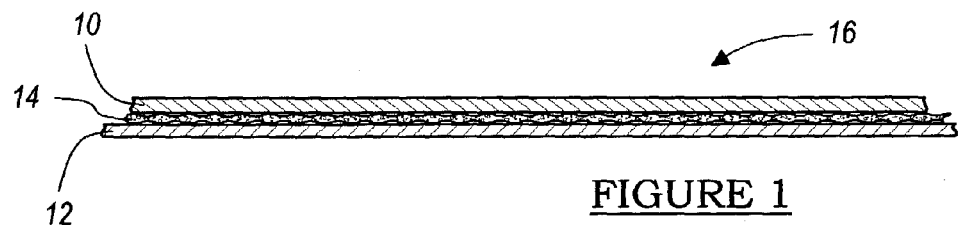
FIG. 1 is a fragmentary sectional view of an illustrative automotive exterior panel system including a first metallic member bonded to a second metallic member with the two-component adhesive composition of the present invention, in accordance with the general teachings of the present invention.

The following description of the preferred embodiment(s) is merely exemplary in nature and is in no way intended to limit the invention, its application, or uses.

The present invention is primarily directed to two-component epoxy adhesive compositions, and methods for using the same. The two-component epoxy adhesive compositions of the present invention are particularly suitable for bonding metallic articles to other metallic articles, metallic articles to non-metallic articles, and non-metallic articles to non-metallic articles. By way of a non-limiting example, the two-component epoxy adhesive compositions of the present invention are particularly suitable for forming automotive exterior panel systems, including metallic and/or non-metallic panel members. By way of another non-limiting example, the two-component epoxy adhesive compositions of the present invention can be employed to bond stamped metal parts together, SMC parts to steel parts, as well as SMC parts to other SMC parts, especially for automotive assembly purposes.

In accordance with the general teachings of the present invention, the two-component epoxy adhesive composition preferably includes an epoxy resin component and an epoxy curative component that are preferably selectively combined in suitable amounts and under suitable conditions to form (e.g., upon curing) the two-component epoxy adhesive compositions.

In accordance with one preferred embodiment of the present invention, the epoxy resin component is present in an amount of about 40 or greater weight percent, based on the combined total weight of the epoxy resin component and the epoxy curative component. In accordance with another preferred embodiment of the present invention, the epoxy resin component is present in an amount of about 50 or greater weight percent, based on the combined total weight of the epoxy resin component and the epoxy curative component. In accordance with still another preferred embodiment of the present invention, the epoxy resin component is present in an amount of about 60 or greater weight percent, based on the combined total weight of the epoxy resin component and the epoxy curative component.

In accordance with a preferred embodiment of the present invention, the epoxy resin component is present in the range of about 40 to about 60 weight percent, based on the combined total weight of the epoxy resin component and the epoxy curative component. In accordance with a more preferred embodiment of the present invention, the epoxy resin component is present in an amount of about 50 weight percent, based on the combined total weight of the epoxy resin component and the epoxy curative component.

In accordance with one preferred embodiment of the present invention, the epoxy curative component is present in an amount of about 40 or greater weight percent, based on the combined total weight of the epoxy resin component and the epoxy curative component. In accordance with another preferred embodiment of the present invention, the epoxy curative component is present in an amount of about 50 or greater weight percent, based on the combined total weight of the epoxy resin component and the epoxy curative component. In accordance with still another preferred embodiment of the present invention, the epoxy curative component is present in an amount of about 60 or greater weight percent, based on the combined total weight of the epoxy resin component and the epoxy curative component.

In accordance with a preferred embodiment of the present invention, the epoxy curative component is present in the range of about 40 to about 60 weight percent, based on the combined total weight of the epoxy resin component and the epoxy curative component. In accordance with a more preferred embodiment of the present invention, the epoxy curative component is present in an amount of about 50 weight percent, based on the combined total weight of the epoxy resin component and the epoxy curative component.

The required and optional components of the epoxy resin component of the present invention will now be described.

The epoxy resin component preferably includes at least one epoxy resin, and still more preferably, an epoxy resin that is a liquid reaction product of epichlorohydrin and bisphenol A. In accordance with a highly preferred embodiment of the present invention, the epoxy resin is comprised of D.E.R. 331, a liquid reaction product of epichlorohydrin and bisphenol A, which is readily commercially available from the Dow Chemical Company (Midland, Mich.).

Typical properties of D.E.R. 331 are set forth in Table I, below:

TABLE I

| Property | Description | Testing Method |
| --- | --- | --- |
| Epoxide Equivalent Weight, (g/eq) | 182–192 | ASTM D-1652 |
| Percentage epoxide (%) | 22.4–23.6 | ASTM D-1652 |
| Epoxide Group Content (mmol/kg) | 5200–5500 | ASTM D-1652 |
| Viscosity @ 25° C. (77° F.), (cps) | 11000–14000 | ASTM D-445 |
| Density @ 25° C. (g/ml) | 1.16 | ASTM D-1475 |
| Color, Platinum Cobalt | 75 | ASTM D-1209 |
| Hydrolyzable Chloride Content, (max. ppm) | 500 | RPM 105-D |
| Epichlorohydrin Content (max. ppm) | 5 | RPM 900-A |
| Non-volatile Content, (wt. %) | 100 | RPM 104-B |
| Flash Point, (° C.) | 252 | ASTM D-93 |
| Water content (max. ppm) | 700 | ASTM E-203 |

In accordance with a preferred embodiment of the present invention, the epoxy resin is present in an amount of about 50 weight percent or greater, based on the total weight of the epoxy resin component formulation. In accordance with another preferred embodiment of the present invention, the epoxy resin is present in an amount of about 60 weight percent or greater, based on the total weight of the epoxy resin component formulation. In accordance with still another preferred embodiment of the present invention, the epoxy resin is present in an amount of about 61 weight percent or greater, based on the total weight of the epoxy resin component formulation. In accordance with still another preferred embodiment of the present invention, the epoxy resin is present in an amount of about 64 weight percent or greater, based on the total weight of the epoxy resin component formulation. In accordance with still yet another preferred embodiment of the present invention, the epoxy resin is present in an amount of about 65 weight percent or greater, based on the total weight of the epoxy resin component formulation. In accordance with a further preferred embodiment of the present invention, the epoxy resin is present in an amount of about 70 weight percent or greater, based on the total weight of the epoxy resin component formulation.

In accordance with a preferred embodiment of the present invention, the epoxy resin is present in the range of about 50 to about 70 weight percent, based on the total weight of the epoxy resin component formulation. In accordance with a more preferred embodiment of the present invention, the epoxy resin is present in the range of about 60 to about 65 weight percent, based on the total weight of the epoxy resin component formulation. In accordance with a highly preferred embodiment of the present invention, the epoxy resin is present in the range of about 61 to about 64 weight percent, based on the total weight of the epoxy resin component formulation.

Without being bound to a particular theory of the operation of the present invention, it is believed that amounts of epoxy resin less than about 50 weight percent, based on the total weight of the epoxy resin component, may lead to relatively lower physical strength in the cured adhesive composition of the present invention. Without being bound to a particular theory of the operation of the present invention, it is believed that amounts of epoxy resin greater than about 70 weight percent, based on the total weight of the epoxy resin component, may lead to relatively lower flexibility in the cured adhesive composition of the present invention.

The epoxy resin component preferably includes at least one flexibilizer, as that term has been defined herein. In accordance with one preferred embodiment of the present invention, the flexibilizer is present in an amount of about 12 or greater weight percent, based on the total weight of the epoxy resin component. In accordance with another preferred embodiment of the present invention, the flexibilizer is present in an amount of about 13 weight percent, based on the total weight of the epoxy resin component. In accordance with still another preferred embodiment of the present invention, the flexibilizer is present in an amount of about 14 weight percent, based on the total weight of the epoxy resin component. In accordance with still yet another preferred embodiment of the present invention, the flexibilizer is present in an amount of about 15 weight percent, based on the total weight of the epoxy resin component. In accordance with a further preferred embodiment of the present invention, the flexibilizer is present in an amount of about 16 weight percent, based on the total weight of the epoxy resin component.

In accordance with a preferred embodiment of the present invention, the flexibilizer is present in the range of about 12 to about 16 weight percent, based on the total weight of the epoxy resin component. In accordance with a more preferred embodiment of the present invention, the flexibilizer is present in the range of about 13 to about 15 weight percent, based on the total weight of the epoxy resin component. In accordance with a highly preferred embodiment of the present invention, the flexibilizer is present in an amount of about 14 weight percent, based on the total weight of the epoxy resin component.

In accordance with a preferred embodiment of the present invention, the flexibilizer can comprise a liquid epoxy resin, and still more preferably, a liquid epoxy resin that is a reaction product of epichlorohydrin and polypropylene glycol. In accordance with a highly preferred embodiment of the present invention, the flexibilizer is comprised of D.E.R. 732, a reaction product of epichlorohydrin and polypropylene glycol, which is readily commercially available from the Dow Chemical Company (Midland, Mich.).

Typical properties of D.E.R. 732 are set forth in Table II, below:

TABLE II

| Property | Description | Testing Method |
| --- | --- | --- |
| Epoxide Equivalent Weight, (g/eq) | 310–330 | ASTM D-1652 |
| Viscosity @ 25° C. (77° F.), (mPa · s) | 55–75 | ASTM D-445 |
| Density @ 25° C. (77° F.), (g/ml) | 1.06 | ASTM D-4052 |
| Color, Platinum Cobalt | 60 Max. | ASTM D-1209 |
| Hydrolyzable Chloride Content, (ppm) | 2000 Max. | RPM 105-D |
| Non-volatile Content, (wt. %) | 99.5 Min. | RPM 104-A |
| Flash Point, (° C.) | 194 | ASTM D-3278 |

In accordance with a preferred embodiment of the present invention, the reaction product of epichlorohydrin and polypropylene glycol is present in the range of about 4 to about 10 weight percent, based on the total weight of the epoxy resin component formulation. In accordance with a more preferred embodiment of the present invention, the reaction product of epichlorohydrin and polypropylene glycol is present in the range of about 4 to about 6 weight percent, based on the total weight of the epoxy resin component formulation. In accordance with a highly preferred embodiment of the present invention, the reaction product of epichlorohydrin and polypropylene glycol is present in the range of about 4 to about 5 weight percent, based on the total weight of the epoxy resin component formulation.

Without being bound to a particular theory of the operation of the present invention, it is believed that amounts of reaction product of epichlorohydrin and polypropylene glycol less than about 4 weight percent, based on the total weight of the epoxy resin component, may lead to relatively lower flexibility (e.g., at relatively lower temperatures) and relatively higher viscosity in the cured adhesive composition of the present invention. Without being bound to a particular theory of the operation of the present invention, it is believed that amounts of reaction product of epichlorohydrin and polypropylene glycol greater than about 10 weight percent, based on the total weight of the epoxy resin component, may lead to relatively lower physical strength in the cured adhesive composition of the present invention.

In accordance with another preferred embodiment of the present invention, the flexibilizer can also comprise an acrylic monomer, and still more preferably, a high functionality acrylic monomer. In accordance with a highly preferred embodiment of the present invention, the flexibilizer is comprised of dipentaerythritol pentaacrylate and is readily commercially available from Sartomer (Exton, Pa.) under the trade name SR-399.

Typical properties of SR-399 are set forth in Table III, below:

TABLE III

| Property | Description |
| --- | --- |
| Acid Content | 0.1% |
| Appearance | Clear liquid |
| Color (APHA) | 50 |
| Functionality | 5 |
| Inhibitor, ppm | 270 mehq |
| Molecular weight | 525 |
| Refractive index, 25° C. | 1.4885 |
| Shrinkage percent | 10 |
| Solvent percent | 0.1 |
| Specific gravity, 25° C. | 1.192 |
| Surface tension, dynes/cm, 20° C. | 39.9 |
| Glass transition temperature, ° C. | 90 |
| Viscosity, cps | 13600 @ 25° C. |
| Water percent | 0.1 |

In accordance with a preferred embodiment of the present invention, the acrylic monomer is present in the range of about 1 to about 10 weight percent, based on the total weight of the epoxy resin component formulation. In accordance with a more preferred embodiment of the present invention, the acrylic monomer is present in the range of about 2 to about 6 weight percent, based on the total weight of the epoxy resin component formulation. In accordance with a highly preferred embodiment of the present invention, the acrylic monomer is present in the range of about 4 to about 6 weight percent, based on the total weight of the epoxy resin component formulation.

Without being bound to a particular theory of the operation of the present invention, it is believed that amounts of acrylic monomer less than about 1 weight percent, based on the total weight of the epoxy resin component, may lead to relatively lower flexibility in the cured adhesive composition of the present invention. Without being bound to a particular theory of the operation of the present invention, it is believed that amounts of acrylic monomer greater than about 10 weight percent, based on the total weight of the epoxy resin component, may be cost-prohibitive due to the high cost of the material.

In accordance with another preferred embodiment of the present invention, the flexibilizer can also comprise a phenol, more preferably an ether of a phenol, and still more preferably a glycidyl ether of an alkyl phenol. In accordance with a highly preferred embodiment of the present invention, the flexibilizer is comprised of a glycidyl ether of 3-alkyl phenol and is readily commercially available from Cardolite Corp. (Newark, N.J.) under the trade name NC-513.

Typical properties of NC-513 are set forth in Table IV, below:

TABLE IV

| Property | Description |
| --- | --- |
| Appearance | Reddish brown liquid |
| Odor | Oily |
| Boiling point | 305° C. |
| Specific gravity | 0.97 @ 24° C. |
| Viscosity @ 25° C., cps | 40–70 (Avg. 30) |

In accordance with a preferred embodiment of the present invention, the glycidyl ether of the alkyl phenol is present in the range of about 4 to about 10 weight percent, based on the total weight of the epoxy resin component formulation. In accordance with a more preferred embodiment of the present invention, the glycidyl ether of the alkyl phenol is present in the range of about 4 to about 6 weight percent, based on the total weight of the epoxy resin component formulation. In accordance with a highly preferred embodiment of the present invention, the glycidyl ether of the alkyl phenol is present in the range of about 4 to about 5 weight percent, based on the total weight of the epoxy resin component formulation.

Without being bound to a particular theory of the operation of the present invention, it is believed that amounts of glycidyl ether of the alkyl phenol less than about 4 weight percent, based on the total weight of the epoxy resin component, may lead to relatively lower flexibility, relatively higher viscosity, and relatively higher moisture sensitivity in the cured adhesive composition of the present invention. Without being bound to a particular theory of the operation of the present invention, it is believed that amounts of glycidyl ether of the alkyl phenol greater than about 10 weight percent, based on the total weight of the epoxy resin component, may lead to relatively lower glass transition temperature and relatively lower physical strength in the cured adhesive composition of the present invention.

The epoxy resin component preferably includes at least one filler, and still more preferably, a metal oxide, and most preferably, an aluminum oxide. In accordance with a highly preferred embodiment of the present invention, the aluminum oxide is comprised of AC-99, readily commercially available from the AluChem, Inc. (Reading, Ohio).

Typical properties of AC-99 are set forth in Table V, below:

TABLE V

| Property | Description |
| --- | --- |
| Chemical formula | $Al_2O_3$ |
| Bulk specific gravity | 3.55 |
| Apparent porosity | 4.0% |
| Water absorption | 1.0% |
| Melting temperature | 2040° C. |
| Refractive index | 1.76 |
| Mohs hardness | 9 |
| Appearance | White crystalline granules or powder |

In accordance with a preferred embodiment of the present invention, the aluminum oxide filler is present in an amount of about 10 or greater weight percent, based on the total weight of the epoxy resin component formulation. In accordance with another preferred embodiment of the present invention, the aluminum oxide filler is present in an amount of about 11 or greater weight percent, based on the total weight of the epoxy resin component formulation. In accordance with still another preferred embodiment of the present invention, the aluminum oxide filler is present in an amount of about 14 or greater weight percent, based on the total weight of the epoxy resin component formulation. In accordance with still yet another preferred embodiment of the present invention, the aluminum oxide filler is present in an amount of about 15 or greater weight percent, based on the total weight of the epoxy resin component formulation. In accordance with a further preferred embodiment of the present invention, the aluminum oxide filler is present in an amount of about 20 or greater weight percent, based on the total weight of the epoxy resin component formulation.

In accordance with a preferred embodiment of the present invention, the aluminum oxide filler is present in the range of about 10 to about 20 weight percent, based on the total weight of the epoxy resin component formulation. In accordance with a more preferred embodiment of the present invention, the aluminum oxide filler is present in the range of about 10 to about 15 weight percent, based on the total weight of the epoxy resin component formulation. In accordance with a highly preferred embodiment of the present invention, the aluminum oxide filler is present in the range of about 11 to about 14 weight percent, based on the total weight of the epoxy resin component formulation.

Without being bound to a particular theory of the operation of the present invention, it is believed that amounts of aluminum oxide filler less than about 10 weight percent, based on the total weight of the epoxy resin component, may lead to relatively lower density, relatively higher moisture sensitivity, and relatively lower abrasion resistance in the cured adhesive composition of the present invention. Without being bound to a particular theory of the operation of the present invention, it is believed that amounts of aluminum oxide filler greater than about 20 weight percent, based on the total weight of the epoxy resin component, may lead to relatively higher density in the cured adhesive composition of the present invention.

The epoxy resin component preferably includes at least one other filler, and still more preferably, a plurality of microspheres, and most preferably, a plurality of hollow glass microspheres. In accordance with a highly preferred embodiment of the present invention, the hollow glass microspheres are comprised of SCOTCHLITE K-25 glass bubbles, readily commercially available from 3M (St. Paul, Minn.).

Typical properties of SCOTCHLITE K-25 glass bubbles are set forth in Table VI, below:

TABLE VI

| Property | Description |
| --- | --- |
| Nitrogen isostatic crush strength (3M QCM 14.1.5) (test pressure (psi)) | 750 |
| Nitrogen isostatic crush strength (3M QCM 14.1.5) (target fractional survival) | 90% |
| Nitrogen isostatic crush strength (3M QCM 14.1.5) (minimum fractional survival) | 80% |

TABLE VI-continued

| Property | Description |
|---|---|
| True density (3M QCM 14.24.1) (typical) | 0.25 |
| True density (3M QCM 14.24.1) (true density (g/cc) min.) | 0.23 |
| True density (3M QCM 14.24.1) (true density (g/cc) max.) | 0.27 |
| Particle size (microns, by volume) (distribution - 10th percentile) | 25 |
| Particle size (microns, by volume) (distribution - 50th percentile) | 55 |
| Particle size (microns, by volume) (distribution - 90th percentile) | 95 |
| Particle size (microns, by volume) (effective top size - 95th percentile) | 105 |

In accordance with a preferred embodiment of the present invention, the microsphere filler is present in an amount of about 5 or greater weight percent, based on the total weight of the epoxy resin component formulation. In accordance with another preferred embodiment of the present invention, the microsphere filler is present in an amount of about 8 or greater weight percent, based on the total weight of the epoxy resin component formulation. In accordance with still another preferred embodiment of the present invention, the microsphere filler is present in an amount of about 10 or greater weight percent, based on the total weight of the epoxy resin component formulation. In accordance with still yet another preferred embodiment of the present invention, the microsphere filler is present in an amount of about 20 or greater weight percent, based on the total weight of the epoxy resin component formulation.

In accordance with a preferred embodiment of the present invention, the microsphere filler is present in the range of about 5 to about 20 weight percent, based on the total weight of the epoxy resin component formulation. In accordance with a more preferred embodiment of the present invention, the microsphere filler is present in the range of about 5 to about 10 weight percent, based on the total weight of the epoxy resin component formulation. In accordance with a highly preferred embodiment of the present invention, the microsphere filler is present in the range of about 8 to about 10 weight percent, based on the total weight of the epoxy resin component formulation.

Optionally, the epoxy resin component preferably includes at least one coupling agent, and still more preferably, a silane-based coupling agent, and most preferably, a silane-based coupling agent containing an epoxy group. In accordance with a highly preferred embodiment of the present invention, the coupling agent is comprised of gamma-glycidochloropropyl methyl trimethoxy silane and is readily commercially available from Crompton Corp. (Middlebury, Conn.) under the trade name SILANE A-187.

In accordance with a preferred embodiment of the present invention, the coupling agent is optionally present in the range of about 0 to about 2 weight percent, based on the total weight of the epoxy resin component formulation. In accordance with a more preferred embodiment of the present invention, the coupling agent is optionally present in the range of about 0 to about 1 weight percent, based on the total weight of the epoxy resin component formulation. In accordance with a highly preferred embodiment of the present invention, the coupling agent is optionally present in the range of about 0 to about 0.6 weight percent, based on the total weight of the epoxy resin component formulation.

Optionally, the epoxy resin component preferably includes at least one pigment, and still more preferably, a black pigment, and most preferably, carbon black. In accordance with a highly preferred embodiment of the present invention, the carbon black is comprised of CSX 316 and is readily commercially available from Cabot Corp. (Billerica, Mass.).

In accordance with a preferred embodiment of the present invention, the carbon black is optionally present in the range of about 0 to about 2 weight percent, based on the total weight of the epoxy resin component formulation. In accordance with a more preferred embodiment of the present invention, the carbon black is optionally present in the range of about 0 to about 1 weight percent, based on the total weight of the epoxy resin component formulation. In accordance with a highly preferred embodiment of the present invention, the carbon black is optionally present in the range of about 0 to about 0.6 weight percent, based on the total weight of the epoxy resin component formulation.

Optionally, the epoxy resin component preferably includes at least one thickener, and still more preferably, a silica-based thickener, and most preferably, a fumed silica thickener. In accordance with a highly preferred embodiment of the present invention, the fumed silica thickener is comprised of CAB-O-SIL TS-720 and is readily commercially available from Cabot Corp. (Billerica, Mass.).

In accordance with a preferred embodiment of the present invention, the thickener is optionally present in the range of about 0 to about 5 weight percent, based on the total weight of the epoxy resin component formulation. In accordance with a more preferred embodiment of the present invention, the thickener is optionally present in the range of about 2 to about 5 weight percent, based on the total weight of the epoxy resin component formulation. In accordance with a highly preferred embodiment of the present invention, the thickener is optionally present in the range of about 4 to about 5 weight percent, based on the total weight of the epoxy resin component formulation.

The required and optional components of the epoxy curative component of the present invention will now be described.

The epoxy curative component preferably includes at least one epoxy-curing agent.

In accordance with one embodiment of the present invention, the epoxy-curing agent preferably comprises a polyamide resin, more preferably triethylenetriamine, and still more preferably is comprised of VERSAMID 140, i.e., triethylenetriamine, which is readily commercially available from Henkel Corp., (Gulph Mills, Pa.).

In accordance with a preferred embodiment of the present invention, the polyamide resin curing-agent (e.g., triethylenetriamine) is present in the range of about 10 to about 20 weight percent, based on the total weight of the epoxy curative component formulation. In accordance with a more preferred embodiment of the present invention, the polyamide resin curing-agent (e.g., triethylenetriamine) is present in the range of about 10 to about 15 weight percent, based on the total weight of the epoxy curative component formulation. In accordance with a highly preferred embodiment of the present invention, the polyamide resin curing-agent (e.g., triethylenetriamine) is present in the range of about 12 to about 15 weight percent, based on the total weight of the epoxy curative component formulation.

In accordance with one embodiment of the present invention, the polyamide resin epoxy-curing agent (e.g., triethylenetriamine) is present in an amount of about 10 or greater weight percent, based on the total weight of the epoxy curative component formulation. In accordance with another embodiment of the present invention, the polyamide resin epoxy-curing agent (e.g., triethylenetriamine) is present in an amount of about 12 or greater weight percent, based on the total weight of the epoxy curative component formulation. In accordance with still another embodiment of the present invention, the polyamide resin epoxy-curing agent (e.g., triethylenetriamine) is present in an amount of about 15 or greater weight percent, based on the total weight of the epoxy curative component formulation. In accordance with still yet another embodiment of the present invention, the polyamide resin epoxy-curing agent (e.g., triethylenetriamine) is present in an amount of about 20 or greater weight percent, based on the total weight of the epoxy curative component formulation.

Without being bound to a particular theory of the operation of the present invention, it is believed that amounts of polyamide resin epoxy-curing agent (e.g., triethylenetriamine) less than about 10 weight percent, based on the total weight of the epoxy curative component, may lead to relatively lower physical strength in the cured adhesive composition of the present invention. Without being bound to a particular theory of the operation of the present invention, it is believed that amounts of polyamide resin epoxy-curing agent (e.g., triethylenetriamine) greater than about 20 weight percent, based on the total weight of the epoxy curative component, may lead to relatively lower physical strength in the cured adhesive composition of the present invention.

In accordance with another embodiment of the present invention, the epoxy-curing agent preferably comprises a polyamine resin, more preferably a liquid aliphatic polyamine resin, and still more preferably is comprised of aminoethylpiperazine, which is readily commercially available from Dow Chemical Co. (Midland, Mich.) under the trade name D.E.H. 39.

Typical properties of D.E.H. 39 are set forth in Table VII, below:

TABLE VII

| Property | Description | Testing Method |
| --- | --- | --- |
| Amine Hydrogen Equivalent Weight, (g.eq) | 43 | Calculated |
| Aminoethylpiperazine, (wt. %) | 98 Min. | DowM 100268 |
| Viscosity @ 25° C., (mPa · s) | 10 | ASTM D-445 |
| Density @ 25° C., (g/ml) | 0.98 | ASTM D-4052 |
| Color, Platinum Cobalt | 50 Max. | ASTM D-1209 |
| Flash Point, (° C.) | 99 | ASTM D-93 |
| Water Content, (ppm) | 5000 Max. | ASTM E-203 |

In accordance with one embodiment of the present invention, the polyamine resin curing-agent (e.g., aminoethylpiperazine) is present in an amount of about 5 or greater weight percent, based on the total weight of the epoxy curative component formulation. In accordance with another embodiment of the present invention, the polyamine resin curing-agent (e.g., aminoethylpiperazine) is present in an amount of about 6 or greater weight percent, based on the total weight of the epoxy curative component formulation. In accordance with still another embodiment of the present invention, the polyamine resin curing-agent (e.g., aminoethylpiperazine) is present in an amount of about 8 or greater weight percent, based on the total weight of the epoxy curative component formulation. In accordance with still another embodiment of the present invention, the polyamine resin curing-agent (e.g., aminoethylpiperazine) is present in an amount of about 10 or greater weight percent, based on the total weight of the epoxy curative component formulation.

In accordance with a preferred embodiment of the present invention, the polyamine resin curing-agent (e.g., aminoethylpiperazine) is present in the range of about 5 to about 10 weight percent, based on the total weight of the epoxy curative component formulation. In accordance with a more preferred embodiment of the present invention, the polyamine resin curing-agent (e.g., aminoethylpiperazine) is present in the range of about 5 to about 8 weight percent, based on the total weight of the epoxy curative component formulation. In accordance with a highly preferred embodiment of the present invention, the polyamine resin curing-agent (e.g., aminoethylpiperazine) is present in the range of about 5 to about 6 weight percent, based on the total weight of the epoxy curative component formulation.

Without being bound to a particular theory of the operation of the present invention, it is believed that amounts of polyamine resin curing-agent (e.g., aminoethylpiperazine) less than about 5 weight percent, based on the total weight of the epoxy curative component, may lead to relatively slower reaction speed in the cured adhesive composition of the present invention. Without being bound to a particular theory of the operation of the present invention, it is believed that amounts of polyamine resin curing-agent (e.g., aminoethylpiperazine) greater than about 10 weight percent, based on the total weight of the epoxy curative component, may lead to relatively lower glass transition temperature and relatively lower physical strength in the cured adhesive composition of the present invention.

In accordance with still another embodiment of the present invention, the epoxy-curing agent preferably comprises a tertiary amine curing agent, more preferably a phenolic-type tertiary amine curing agent, and still more preferably is comprised of 2,4,6-Tri(dimethylaminomethyl)phenol, which is readily commercially available from Air Products and Chemicals, Inc. (Allentown, Pa.) under the trade name ANCAMINE K54.

Typical properties of ANCAMINE K54 are set forth in Table VIII, below:

TABLE VIII

| Property | Description |
| --- | --- |
| Color (Gardner) | 6 |
| Physical form | Amber liquid |
| Viscosity @ 25° C. | 200 |
| Specific gravity @ 25° C. | 0.98 |
| Flash point (° F.) | 284 |

In accordance with one embodiment of the present invention, the tertiary amine curing-agent (e.g., 2,4,6-Tri(dimethylaminomethyl)phenol) is present in an amount of about 1 or greater weight percent, based on the total weight of the epoxy curative component formulation. In accordance with another embodiment of the present invention, the tertiary amine curing agent (e.g., 2,4,6-Tri(dimethylaminomethyl)phenol) is present in an amount of about 1.5 or greater weight percent, based on the total weight of the epoxy curative component formulation. In accordance with still another embodiment of the present invention, the tertiary amine curing-agent (e.g., 2,4,6-Tri(dimethylaminomethyl)phenol) is present in an amount of about 2 or greater weight percent, based on the total weight of the epoxy curative component formulation. In accordance with still yet another embodiment of the present invention, the tertiary amine curing-agent (e.g., 2,4,6-Tri(dimethylaminomethyl)phenol) is present in an amount of about 5 or greater weight percent, based on the total weight of the epoxy curative component formulation.

In accordance with a preferred embodiment of the present invention, the tertiary amine curing-agent (e.g., 2,4,6-Tri (dimethylaminomethyl)phenol) is present in the range of about 1 to about 5 weight percent, based on the total weight of the epoxy curative component formulation. In accordance with a more preferred embodiment of the present invention, the tertiary amine curing-agent (e.g., 2,4,6-Tri(dimethylaminomethyl)phenol) is present in the range of about 1 to about 2 weight percent, based on the total weight of the epoxy curative component formulation. In accordance with a highly preferred embodiment of the present invention, the tertiary amine curing-agent (e.g., 2,4,6-Tri(dimethylaminomethyl)phenol) is present in the range of about 1 to about 1.5 weight percent, based on the total weight of the epoxy curative component formulation.

Without being bound to a particular theory of the operation of the present invention, it is believed that amounts of tertiary amine curing-agent (e.g., 2,4,6-Tri(dimethylaminomethyl)phenol) less than about 1 weight percent, based on the total weight of the epoxy curative component, may lead to relatively lower reaction speed control in the cured adhesive composition of the present invention. Without being bound to a particular theory of the operation of the present invention, it is believed that amounts of tertiary amine curing-agent (e.g., 2,4,6-Tri(dimethylaminomethyl) phenol) greater than about 5 weight percent, based on the total weight of the epoxy curative component, may lead to relatively lower glass transition temperature and relatively lower physical strength in the cured adhesive composition of the present invention.

The epoxy curative component preferably includes at least one flexibilizer, as that term has been defined herein. In accordance with one preferred embodiment of the present invention, the flexibilizer is present in an amount of about 55 or greater weight percent, based on the total weight of the epoxy curative component. In accordance with another preferred embodiment of the present invention, the flexibilizer is present in an amount of about 57 weight percent, based on the total weight of the epoxy curative component. In accordance with still another preferred embodiment of the present invention, the flexibilizer is present in an amount of about 60 weight percent, based on the total weight of the epoxy curative component. In accordance with still yet another preferred embodiment of the present invention, the flexibilizer is present in an amount of about 63 weight percent, based on the total weight of the epoxy curative component. In accordance with a further preferred embodiment of the present invention, the flexibilizer is present in an amount of about 65 weight percent, based on the total weight of the epoxy curative component.

In accordance with a preferred embodiment of the present invention, the flexibilizer is present in the range of about 55 to about 65 weight percent, based on the total weight of the epoxy curative component. In accordance with a more preferred embodiment of the present invention, the flexibilizer is present in the range of about 57 to about 63 weight percent, based on the total weight of the epoxy curative component. In accordance with a highly preferred embodiment of the present invention, the flexibilizer is present in an amount of about 60 weight percent, based on the total weight of the epoxy curative- component.

In accordance with a preferred embodiment of the present invention, the flexibilizer can comprise an amine terminated butadiene nitrile copolymer. In accordance with a more preferred embodiment of the present invention, the flexibilizer is comprised of HYCAR 1300X16, an amine terminated butadiene nitrile copolymer, which is readily commercially available from Noveon Specialty Chemicals (Cleveland, Ohio).

Typical properties of HYCAR 1300X16 are set forth in Table IX, below:

TABLE IX

| Property | Description |
| --- | --- |
| Acrylonitrile Content, % | 18 |
| Amine Equivalent Weight | 900 |
| Amine value | 62 |
| Brookfield viscosity @ 27° C., (mPa · s) | 200,000 |
| Specific gravity @ 25° C. | 0.956 |
| Glass transition temperature ($T_g$), ° C. | −51 |

In accordance with one embodiment of the present invention, the amine terminated butadiene nitrile copolymer is present in an amount of about 10 or greater weight percent, based on the total weight of the epoxy curative component formulation. In accordance with another embodiment of the present invention, the amine terminated butadiene nitrile copolymer is present in an amount of about 20 or greater weight percent, based on the total weight of the epoxy curative component formulation. In accordance with still another embodiment of the present invention, the amine terminated butadiene nitrile copolymer is present in an amount of about 24 or greater weight percent, based on the total weight of the epoxy curative component formulation. In accordance with still yet another embodiment of the present invention, the amine terminated butadiene nitrile copolymer is present in an amount of about 28 or greater weight percent, based on the total weight of the epoxy curative component formulation. In accordance with a further embodiment of the present invention, the amine terminated butadiene nitrile copolymer is present in an amount of about 30 or greater weight percent, based on the total weight of the epoxy curative component formulation.

In accordance with a preferred embodiment of the present invention, the amine terminated butadiene nitrile copolymer is present in the range of about 10 to about 30 weight percent, based on the total weight of the epoxy curative component formulation. In accordance with a more preferred embodiment of the present invention, the amine terminated butadiene nitrile copolymer is present in the range of about 20 to about 30 weight percent, based on the total weight of the epoxy curative component formulation. In accordance with a highly preferred embodiment of the present invention, the amine terminated butadiene nitrile copolymer is present in the range of about 24 to about 28 weight percent, based on the total weight of the epoxy curative component formulation.

Without being bound to a particular theory of the operation of the present invention, it is believed that amounts of amine terminated butadiene nitrile copolymer less than about 10 weight percent, based on the total weight of the epoxy curative component, may lead to relatively lower flexibility in the cured adhesive composition of the present invention. Without being bound to a particular theory of the operation of the present invention, it is believed that amounts of amine terminated butadiene nitrile copolymer greater than about 30 weight percent, based on the total weight of the epoxy curative component, may lead to relatively lower glass transition temperature and relatively lower physical strength in the cured adhesive composition of the present invention.

In accordance with another preferred embodiment of the present invention, the flexibilizer can also comprise an aliphatic amine adduct. In accordance with a more preferred embodiment of the present invention, the flexibilizer is comprised of ANCAMINE 1767, an aliphatic amine adduct, which is readily commercially available from Air Products and Chemicals, Inc. (Allentown, Pa.).

Typical properties of ANCAMINE 1767 are set forth in Table X, below:

TABLE X

| Property | Description |
| --- | --- |
| Color (Gardner) | 2 |
| Physical form | Light yellow liquid |
| Viscosity @ 25° C. | 6,000 |
| Amine value (mg KOH/g) | 310 |
| Specific gravity @ 25° C. | 0.97 |
| Equivalent Wt/{H} | 180 |
| Gel time (min. @ 25° C., 150 g mix) | 7 |
| Thin film set time (hr. @ 25° C.) | 2.5 |

In accordance with one embodiment of the present invention, the aliphatic amine adduct is present in an amount of about 5 or greater weight percent, based on the total weight of the epoxy curative component formulation. In accordance with another embodiment of the present invention, the aliphatic amine adduct is present in an amount of about 6 or greater weight percent, based on the total weight of the epoxy curative component formulation. In accordance with still another embodiment of the present invention, the aliphatic amine adduct is present in an amount of about 9 or greater weight percent, based on the total weight of the epoxy curative component formulation. In accordance with still yet another embodiment of the present invention, the aliphatic amine adduct is present in an amount of about 10 or greater weight percent, based on the total weight of the epoxy curative component formulation.

In accordance with a preferred embodiment of the present invention, the aliphatic amine adduct is present in the range of about 5 to about 10 weight percent, based on the total weight of the epoxy curative component formulation. In accordance with a more preferred embodiment of the present invention, the aliphatic amine adduct is present in the range of about 6 to about 10 weight percent, based on the total weight of the epoxy curative component formulation. In accordance with a highly preferred embodiment of the present invention, the aliphatic amine adduct is present in the range of about 6 to about 9 weight percent, based on the total weight of the epoxy curative component formulation.

Without being bound to a particular theory of the operation of the present invention, it is believed that amounts of aliphatic amine adduct less than about 5 weight percent, based on the total weight of the epoxy curative component, may lead to relatively lower flexibility, relatively lower physical strength, and relatively higher Young's modulus in the cured adhesive composition of the present invention. Without being bound to a particular theory of the operation of the present invention, it is believed that amounts of aliphatic amine adduct greater than about 10 weight percent, based on the total weight of the epoxy curative component, may lead to relatively lower glass transition temperature and relatively lower physical strength in the cured adhesive composition of the present invention.

In accordance with still another preferred embodiment of the present invention, the flexibilizer can also comprise a polyamide adduct. In accordance with a more preferred embodiment of the present invention, the flexibilizer is comprised of ANCAMIDE 2050, a polyamide adduct, which is readily commercially available from Air Products and Chemicals, Inc. (Allentown, Pa.).

Typical properties of ANCAMIDE 2050 are set forth in Table XI, below:

TABLE XI

| Property | Description |
| --- | --- |
| Color (Gardner) | 6–8 |
| Physical form | Clear, amber liquid |
| Viscosity @ 25° C. | 4,000 |
| Amine value (mg KOH/g) | 225 |
| Specific gravity @ 25° C. | 1.02 |
| Flash point (° F.) | >200 |
| Equivalent Wt/{H} | 150 |
| Gel time (min. @ 25° C., 150 g mix) | 100 |
| Thin film set time (hr. @ 25° C.) | 7 |

In accordance with one embodiment of the present invention, the polyamide adduct is present in an amount of about 10 or greater weight percent, based on the total weight of the epoxy curative component formulation. In accordance with another embodiment of the present invention, the polyamide adduct is present in an amount of about 13 or greater weight percent, based on the total weight of the epoxy curative component formulation. In accordance with still another embodiment of the present invention, the polyamide adduct is present in an amount of about 14 or greater weight percent, based on the total weight of the epoxy curative component formulation. In accordance with still yet another embodiment of the present invention, the polyamide adduct is present in an amount of about 15 or greater weight percent, based on the total weight of the epoxy curative component formulation.

In accordance with a preferred embodiment of the present invention, the polyamide adduct is present in the range of about 10 to about 15 weight percent, based on the total weight of the epoxy curative component formulation. In accordance with a more preferred embodiment of the present invention, the polyamide adduct is present in the range of about 13 to about 15 weight percent, based on the total weight of the epoxy curative component formulation. In accordance with a highly preferred embodiment of the present invention, the polyamide adduct is present in the range of about 14 to about 15 weight percent, based on the total weight of the epoxy curative component formulation.

Without being bound to a particular theory of the operation of the present invention, it is believed that amounts of polyamide adduct less than about 10 weight percent, based on the total weight of the epoxy curative component, may lead to relatively lower flexibility and relatively lower impact resistance in the cured adhesive composition of the present invention. Without being bound to a particular theory of the operation of the present invention, it is believed that amounts of polyamide adduct greater than about 15 weight percent, based on the total weight of the epoxy curative component, may lead to relatively lower glass transition temperature and relatively lower physical strength in the cured adhesive composition of the present invention.

In accordance with still yet another preferred embodiment of the present invention, the flexibilizer can also comprise a phenoxy alcohol. In accordance with a more preferred embodiment of the present invention, the flexibilizer is comprised of CARDOLITE 2020, a phenoxy alcohol, which is readily commercially available from Cardolite Corp. (Newark, N.J.).

In accordance with one embodiment of the present invention, the phenoxy alcohol is present in an amount of about 10 or greater weight percent, based on the total weight of the epoxy curative component formulation. In accordance with another embodiment of the present invention, the phenoxy alcohol is present in an amount of about 11 or greater weight percent, based on the total weight of the epoxy curative component formulation. In accordance with still another embodiment of the present invention, the phenoxy alcohol is present in an amount of about 13 or greater weight percent, based on the total weight of the epoxy curative component formulation. In accordance with still yet another embodiment of the present invention, the phenoxy alcohol is present in an amount of about 15 or greater weight percent, based on the total weight of the epoxy curative component formulation.

In accordance with a preferred embodiment of the present invention, the phenoxy alcohol is present in the range of about 10 to about 15 weight percent, based on the total weight of the epoxy curative component formulation. In accordance with a more preferred embodiment of the present invention, the phenoxy alcohol is present in the range of about 10 to about 13 weight percent, based on the total weight of the epoxy curative component formulation. In accordance with a highly preferred embodiment of the present invention, the phenoxy alcohol is present in the range of about 11 to about 13 weight percent, based on the total weight of the epoxy curative component formulation.

Without being bound to a particular theory of the operation of the present invention, it is believed that amounts of phenoxy alcohol less than about 10 weight percent, based on the total weight of the epoxy curative component, may lead to relatively lower flexibility, relatively higher viscosity, and relatively higher moisture sensitivity in the cured adhesive composition of the present invention. Without being bound to a particular theory of the operation of the present invention, it is believed that amounts of phenoxy alcohol greater than about 15 weight percent, based on the total weight of the epoxy curative component, may lead to relatively lower physical strength, lower glass transition temperature, and relatively lower viscosity in the cured adhesive composition of the present invention.

The epoxy curative component preferably includes at least one filler, and more preferably a plurality of glass beads. In accordance with a highly preferred embodiment of the present invention, the glass beads are comprised of GLAS SHOT glass beads, readily commercially available from Cataphote, Inc. (Jackson, Miss.). The exact diameter of the glass beads are not thought to be critical to the success of the present invention; however, glass beads having a diameter of about 0.26 mm are preferred.

In accordance with one embodiment of the present invention, the glass beads are present in an amount of about 1 or greater weight percent, based on the total weight of the epoxy curative component formulation. In accordance with another embodiment of the present invention, the glass beads are present in an amount of about 2 or greater weight percent, based on the total weight of the epoxy curative component formulation. In accordance with still another embodiment of the present invention, the glass beads are present in an amount of about 3 or greater weight percent, based on the total weight of the epoxy curative component formulation. In accordance with still yet another embodiment of the present invention, the glass beads are present in an amount of about 4 or greater weight percent, based on the total weight of the epoxy curative component formulation. In accordance with a further embodiment of the present invention, the glass beads are present in an amount of about 5 or greater weight percent, based on the total weight of the epoxy curative component formulation.

In accordance with a preferred embodiment of the present invention, the glass beads are present in the range of about 1 to about 5 weight percent, based on the total weight of the epoxy curative component formulation. In accordance with a more preferred embodiment of the present invention, the glass beads are present in the range of about 2 to about 4 weight percent, based on the total weight of the epoxy curative component formulation. In accordance with a highly preferred embodiment of the present invention, the glass beads are present in the range of about 3 to about 4 weight percent, based on the total weight of the epoxy curative component formulation.

The epoxy curative component optionally includes at least one other filler, and still more preferably, a plurality of microspheres, and most preferably, a plurality of hollow glass microspheres. In accordance with a highly preferred embodiment of the present invention, the hollow glass microspheres are comprised of SCOTCHLITE K-25 glass bubbles, readily commercially available from 3M (St. Paul, Minn.), as previously described.

In accordance with a preferred embodiment of the present invention, the microspheres are optionally present in the range of about 0 to about 10 weight percent, based on the total weight of the epoxy curative component formulation. In accordance with a more preferred embodiment of the present invention, the microspheres are optionally present in the range of about 4 to about 8 weight percent, based on the total weight of the epoxy curative component formulation. In accordance with a highly preferred embodiment of the present invention, the microspheres are optionally present in the range of about 4 to about 6 weight percent, based on the total weight of the epoxy curative component formulation.

The epoxy resin component optionally includes at least still one other filler, and still more preferably, a metal oxide, and most preferably, an aluminum oxide. In accordance with a highly preferred embodiment of the present invention, the aluminum oxide is comprised of AC-99, readily commercially available from the AluChem, Inc. (Reading, Ohio), as previously described.

In accordance with a preferred embodiment of the present invention, the aluminum oxide is optionally present in the range of about 0 to about 20 weight percent, based on the total weight of the epoxy curative component formulation. In accordance with a more preferred embodiment of the present invention, the aluminum oxide is optionally present in the range of about 5 to about 10 weight percent, based on the total weight of the epoxy curative component formulation. In accordance with a highly preferred embodiment of the present invention, the aluminum oxide is optionally present in the range of about 7 to about 9 weight percent, based on the total weight of the epoxy curative component formulation.

Optionally, the epoxy curative component preferably includes at least one thickener, and still more preferably, a silica-based thickener, and most preferably, a fumed silica thickener. In accordance with a highly preferred embodiment of the present invention, the fumed silica thickener is comprised of CAB-O-SIL TS-720 and is readily commercially available from Cabot Corp. (Billerica, Mass.), as previously described.

In accordance with a preferred embodiment of the present invention, the thickener is optionally present in the range of about 0 to about 5 weight percent, based on the total weight of the epoxy curative component formulation. In accordance with a more preferred embodiment of the present invention, the thickener is optionally present in the range of about 1 to about 4 weight percent, based on the total weight of the epoxy curative component formulation. In accordance with a highly preferred embodiment of the present invention, the thickener is optionally present in the range of about 2 to about 3 weight percent, based on the total weight of the epoxy curative component formulation.

The adhesive composition of the present invention can be applied to various substrates including metallic (e.g., steel, aluminum, magnesium and so forth) and non-metallic (e.g., thermoplastics and thermosets) in order to bond the various substrates to one another. By way of a non-limiting example, the adhesive composition can be used to bond metallic substrates such as, but not limited to hot dipped galvanized steel, electro-galvanized steel, cold rolled steel, aluminum and magnesium. By way of a non-limiting example, the adhesive composition can be used to bond non-metallic substrates such as, but not limited to SMC and high surface energy thermoplastics.

Figure 2:
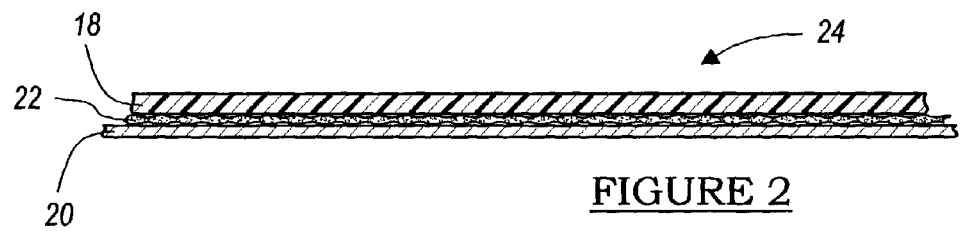
FIG. 2 is a fragmentary sectional view of an illustrative automotive exterior panel system including a non-metallic member bonded to a metallic member with the two-component adhesive composition of the present invention, in accordance with the general teachings of the present invention.
Figure 3:
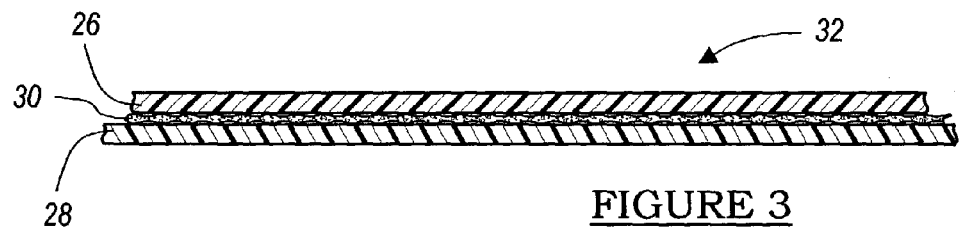
FIG. 3 is a fragmentary sectional view of an illustrative automotive exterior panel system including a first non-metallic member bonded to a second non-metallic member with the two-component adhesive composition of the present invention, in accordance with the general teachings of the present invention.

Referring to FIGS. 1–3, the adhesive composition of the present invention is shown: bonding a metallic member 10 to another metallic member, 12 with the adhesive composition 14 disposed therebetween to form a metallic panel system 16 (FIG. 1); bonding a metallic member 18 to a non-metallic member 20, with the adhesive composition 22 disposed therebetween to form a metallic/non-metallic panel system 24 (FIG. 2); and bonding a non-metallic member 26 to another non-metallic member 28, with the adhesive composition 30 disposed therebetween to form a non-metallic panel member system 32 (FIG. 3).

One application of the adhesive composition of the present invention can include, without limitation, the bonding of SMC parts such as automotive doors, hoods, tailgates and other body panels. The bonding process can be carried out at a manufacturing facility (e.g., stamping plant), assembly facility (automotive plant), or repair facility (e.g., body shop).

Once the epoxy resin component and the epoxy curative component are mixed in the previously described ratios, the adhesive composition of the present invention will then begin to cure and should preferably be applied to the respective surface(s) before the adhesive composition fully cures. By way of non-limiting examples, the adhesive composition can be: (1) applied to one surface of an article or component to be bonded to another article or component; and/or (2) applied to one or more surfaces of adjacent or abutting surfaces of two or more articles or components to be bonded together.

By way of a non-limiting example, the adhesive composition of the present invention is preferably applied to a surface at a temperature of about 10° C. or greater, more preferably at a temperature of about 50° C. or greater, and most preferably in the range of about 10° C. to about 50° C.

The adhesive composition of the present invention is preferably capable of being applied to a surface either manually or automatically, and can preferably be applied with a pump, sprayer, roller, dipper, and any other suitable methods. By way of a non-limiting example, the adhesive composition of the present invention can be streamed, swirled, extruded, roll coated, flow coated, flow brushed or spray applied onto a surface.

Figure 4:
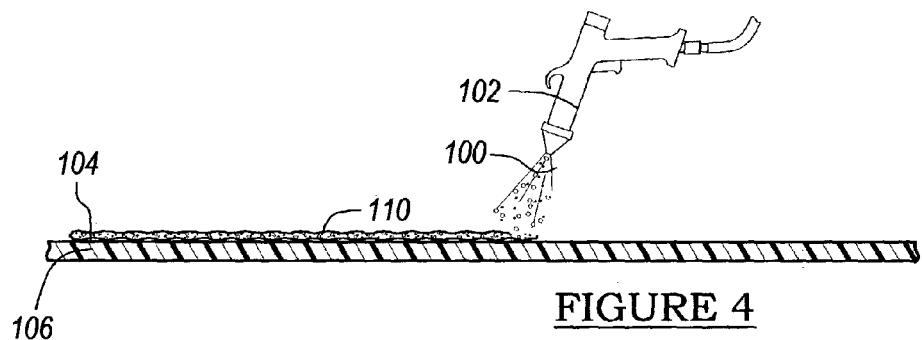
FIG. 4 is a perspective view of the two-component adhesive composition of the present invention being applied to a first panel member, in accordance with the general teachings of the present invention.
Figure 5:
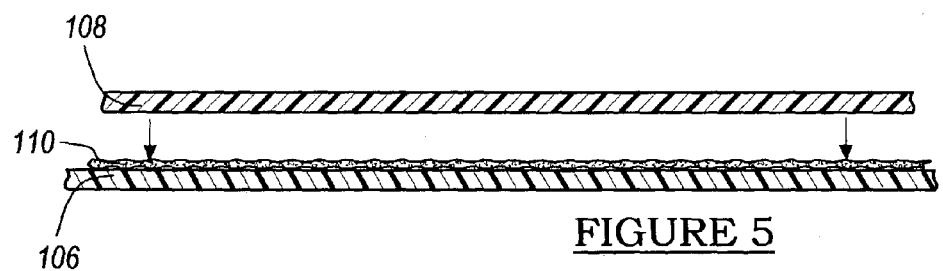
FIG. 5 is a perspective view of a second panel member being brought into contact with the two-component adhesive composition of the present invention that has been previously applied to the first panel member, as shown in FIG. 4, in accordance with the general teachings of the present invention.

With reference to FIGS. 4–5, the adhesive composition 100 of the present invention is shown being applied, with a spray/extrusion nozzle 102, to a surface 104 of a first member 106 (the exact configuration of the member is not thought to be critical to the success of the present invention). A second member 108, whether or not containing additional amounts of the adhesive composition 100 of the present invention, is then brought into contact with the sprayed/extruded surface 110 of the first member 106. In this manner the two members 106, 108 will be securely bonded to one another upon curing of the adhesive composition 100 of the present invention.

By way of a non-limiting example, the adhesive composition of the present invention achieves final cure strength within about 7 days at ambient temperature, or 30 minutes when exposed to a temperature range of about 150° C. to about 190° C.

Figure 6:
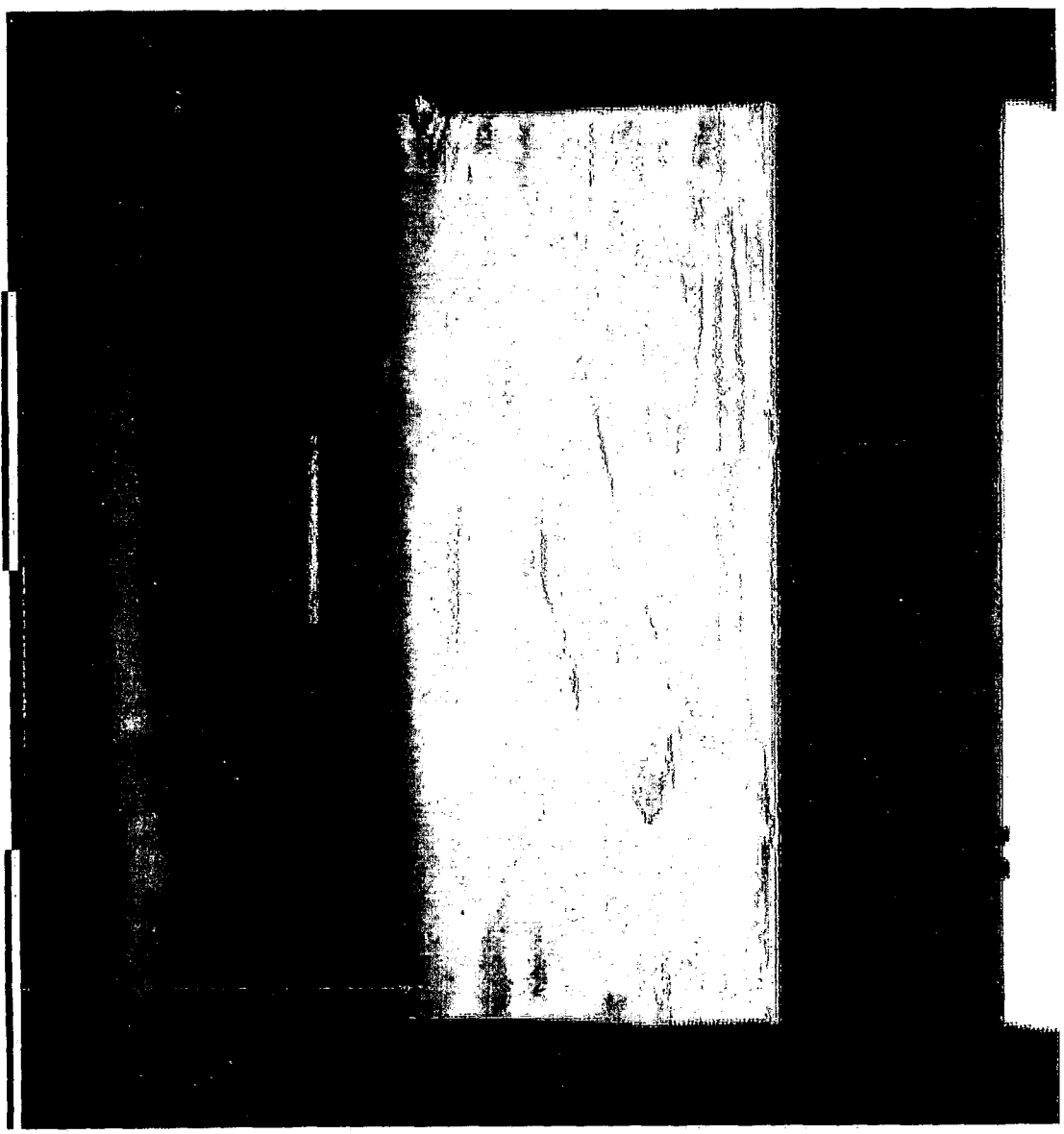
FIG. 6 is a front elevational view of a photograph of a first exterior automotive panel system, using a conventional adhesive composition to bond the respective panel members, in accordance with the prior art.
Figure 7:
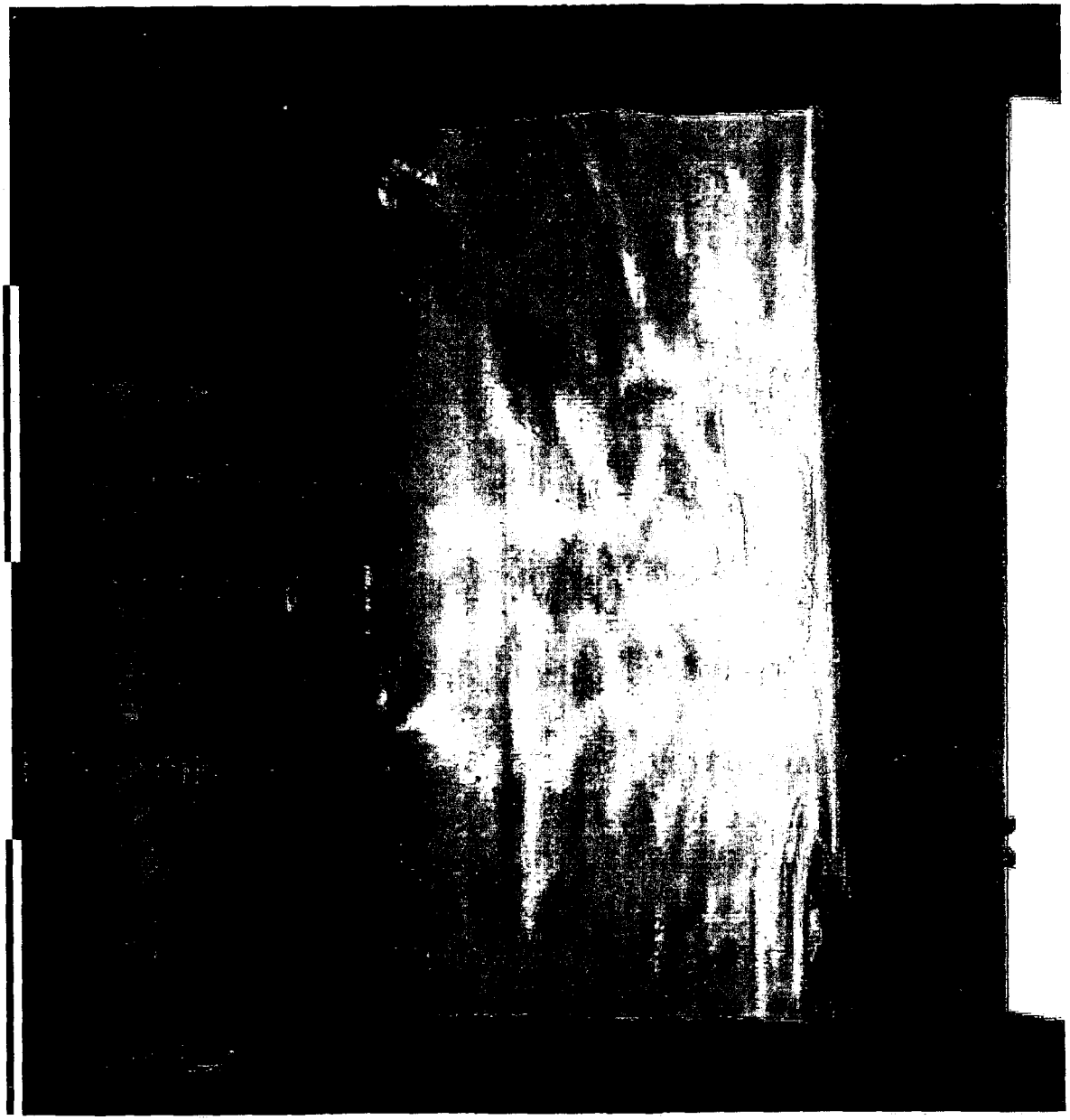
FIG. 7 is a front elevational view of a photograph of a second exterior automotive panel, using a conventional adhesive composition to bond the respective panel members, in accordance with the prior art.

With reference to FIGS. 6–7, there are shown photographs of panels systems, specifically automotive door surfaces, using adhesive compositions in accordance with the prior art, specifically a polyurethane-based adhesive composition. Both of these samples show mild read though and thus are not aesthetically pleasing.

Figure 8:
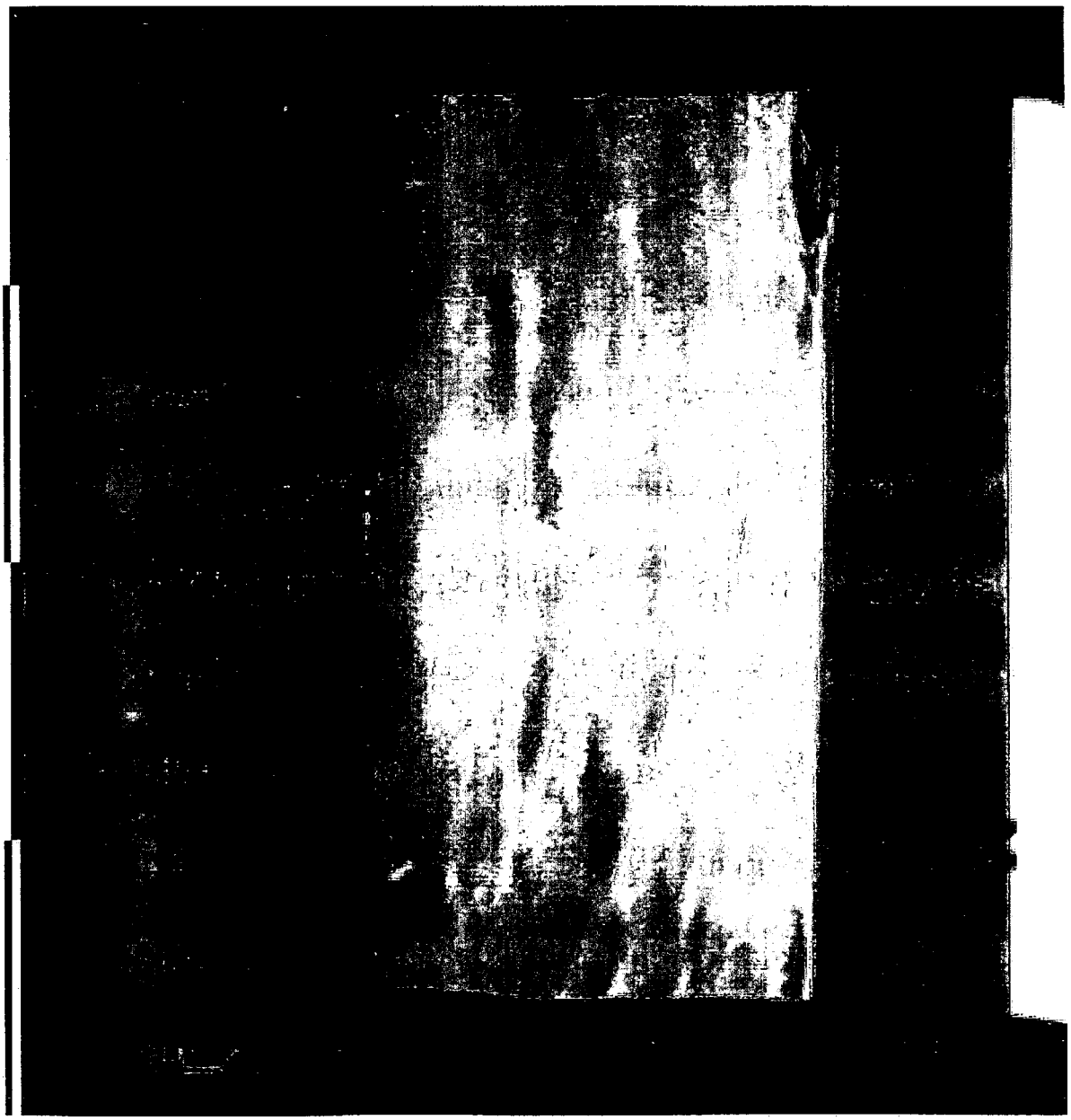
FIG. 8 is a front elevational view of a photograph of a first exterior automotive panel, using the two-component adhesive composition of the present invention to bond the respective panel members, in accordance with the general teachings of the present invention.
Figure 9:
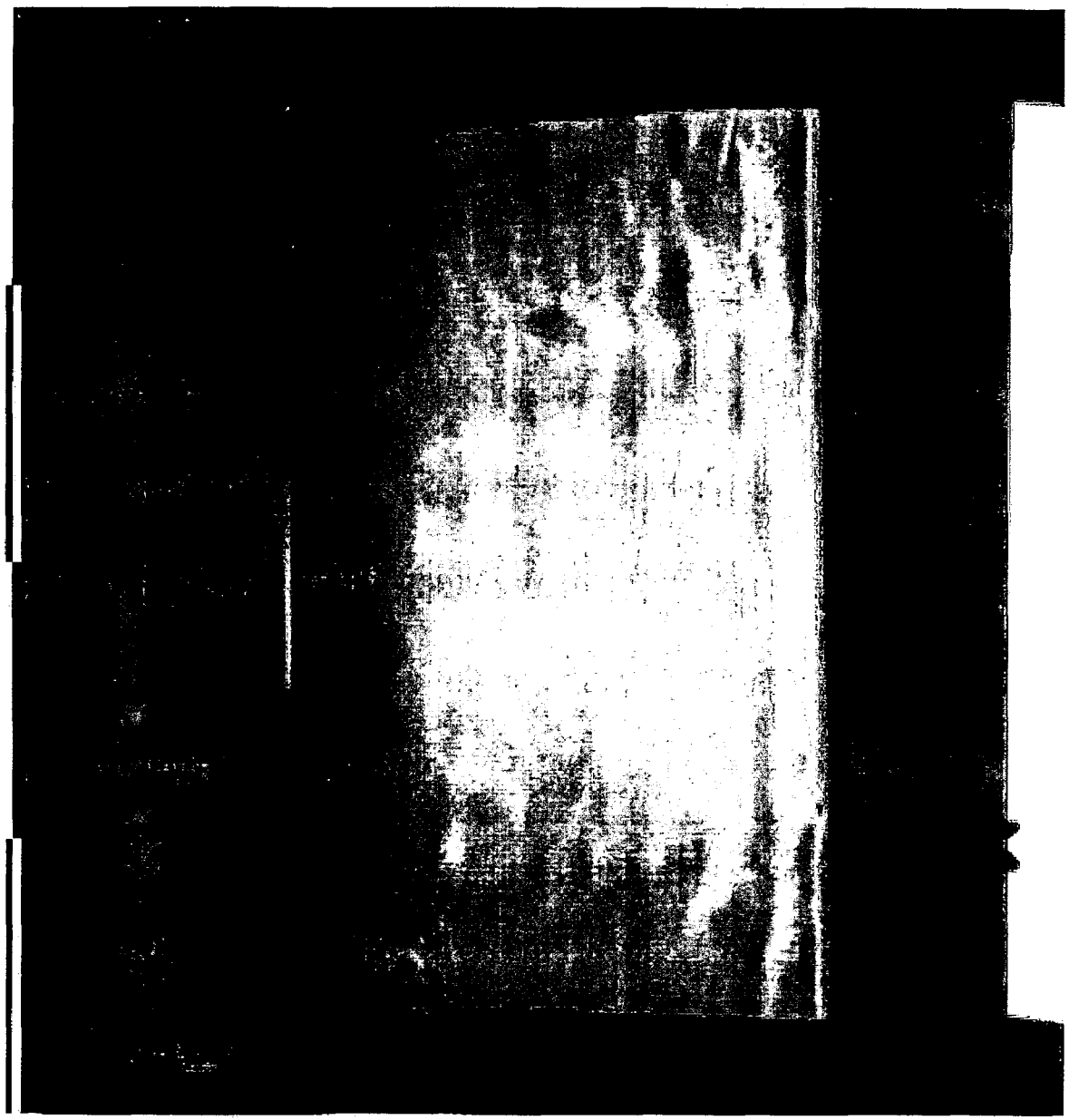
FIG. 9 is a front elevational view of a photograph of a second exterior automotive panel, using the two-component adhesive composition of the present invention to bond the respective panel members, in accordance with the general teachings of the present invention.

With reference to FIGS. 8–9, there are shown photographs of panels systems, specifically automotive door surfaces, using adhesive compositions in accordance with the present invention. Both of these samples show virtually no read though and thus are significantly more aesthetically pleasing than those samples shown in FIGS. 6–7.

In order to evaluate the performance of the adhesive composition of the present invention, a series of comparative tests were conducted between the adhesive composition of the present invention and a conventional two-component epoxy adhesive designated BD-66A3. It is believed that the compositions differed with respect to the epoxy resin compositions. It is believed that the chemical composition of the epoxy resin component of BD-66A3 is as follows, as set forth in Table XII, below:

TABLE XII

| Commercial Name of Material | Weight percent |
| --- | --- |
| D.E.R. 331 | 58 |
| D.E.R. 732 | 12 |
| SR-399 | 6 |
| CARDOLITE NC-513 | 0 |
| SILANE A-187 | 0.6 |
| Carbon black | 0.8 |
| Aluminum oxide | 9 |
| Glass bubble | 11 |
| CAB-O-SIL TS-720 | 2.6 |

The same epoxy curative component composition was used for the following tests. The first comparative test compared the performance of the respective adhesive compositions with SMC members. Of particular interest was the lap shear strength (expressed in psi) and failure mode, if any, of the respective adhesive compositions. Specifically, a 3 day water immersion with no recovery test was performed, with the following results shown in Table XIII, below:

TABLE XIII

| Property | BD-66A3 | Adhesive Composition of the Present Invention |
|---|---|---|
| Lap shear strength (psi) | 595 | 800 |
| Failure mode (FM) | Cohesive (CF)/Fiber Tear (FT) | Cohesive (CF)/Fiber Tear (FT) |

The second comparative test compared the performance of the respective adhesive compositions with SMC members. Specifically, a 3 day water immersion with 3 days recovery test was performed, with the following results shown in Table XIV, below:

TABLE XIV

| Property | BD-66A3 | Adhesive Composition of the Present Invention |
|---|---|---|
| Lap shear strength (psi) | 679 | 749 |
| Failure mode (FM) | Cohesive (CF) | Fiber tear (FT) |

The third comparative test compared the performance of the respective adhesive compositions with SMC members. Specifically, a 6 day water immersion with no recovery test was performed, with the following results shown in Table XV, below:

TABLE XV

| Property | BD-66A3 | Adhesive Composition of the Present Invention |
|---|---|---|
| Lap shear strength (psi) | 609 | 679 |
| Failure mode (FM) | Cohesive (CF) | Fiber tear (FT) |

The fourth comparative test compared the performance of the respective adhesive compositions with SMC members. Specifically, a 7 day water immersion with no recovery test was performed, with the following results shown in Table XVI, below:

TABLE XVI

| Property | BD-66A3 | Adhesive Composition of the Present Invention |
|---|---|---|
| Lap shear strength (psi) | 590 | 550 |
| Failure mode (FM) | Cohesive (CF) | Fiber tear (FT) |

The fifth comparative test compared the performance of the respective adhesive compositions with SMC members. Specifically, a 7 day water immersion with a 1.5 hour recovery test was performed, with the following results shown in Table XVII, below:

TABLE XVII

| Property | BD-66A3 | Adhesive Composition of the Present Invention |
|---|---|---|
| Lap shear strength (psi) | 562 | 616 |
| Failure mode (FM) | Cohesive (CF) | Fiber tear (FT) |

As the results in Tables XIII–XVII illustrate, the adhesive compositions of the present invention exhibit comparable or superior lap shear strength as compared to conventional two-component epoxy adhesive compositions. Additionally, the adhesive compositions of the present invention exhibit more preferable failure mode characteristics as compared to conventional two- component epoxy adhesive compositions.

In order to further evaluate the performance of the adhesive composition of the present invention, a series of comparative tests were conducted between the adhesive composition of the present invention and a conventional two-component epoxy adhesive designated BD-72B. It is believed that the compositions differed with respect to the epoxy curative compositions. It is believed that the chemical composition of the epoxy curative component of BD-72B, is as follows, as set forth in Table XVIII, below:

TABLE XVIII

| Commercial Name of Material | Weight percent |
|---|---|
| HYCAR ATBN X16 | 28 |
| VERSAMID 140 | 12 |
| D.E.H. 39 | 5 |
| ANCAMINE K54 | 1 |
| ANCAMINE 1767 | 9 |
| ANCAMIDE 2050 | 15 |
| CARDOLITE LITE 2020 | 11 |
| Glass microspheres | 4 |
| 3M K25 glass bubbles | 4.5 |
| Aluminum oxide | 7.5 |
| CAB-O-SIL TS-720 | 3 |

The same epoxy resin component composition was used for the following tests. The first comparative test compared the performance of the respective adhesive compositions with SMC members. Of particular interest was the lap shear strength (expressed in psi) and failure mode, if any, of the respective adhesive compositions. Specifically, a 3 day water immersion with no recovery test was performed, with the following results shown in Table XIX, below:

TABLE XIX

| Material | BD-72B | Adhesive Composition of the Present Invention |
|---|---|---|
| Lap shear strength (psi) | 659 | 800 |
| Failure Mode (FM) | Cohesive (CF) | Cohesive (CF) |

The second comparative test compared the performance of the respective adhesive compositions with SMC members. Specifically, a 3 day water immersion with 3 days recovery test was performed, with the following results shown in Table XX, below:

TABLE XX

| Material | BD-72B | Adhesive Composition of the Present Invention |
|---|---|---|
| Lap shear strength (psi) | 769 | 749 |
| Failure Mode (FM) | Cohesive (CF) | Fiber tear (FT) |

The third comparative test compared the performance of the respective adhesive compositions with SMC members. Specifically, a 6 day water immersion with no recovery test was performed, with the following results shown in Table XXI, below:

TABLE XXI

| Material | BD-72B | Adhesive Composition of the Present Invention |
|---|---|---|
| Lap shear strength (psi) | 660 | 679 |
| Failure Mode (FM) | Cohesive (CF) | Fiber tear (FT) |

The fourth comparative test compared the performance of the respective adhesive compositions with SMC members.

Specifically, a 7 day water immersion with no recovery test was performed, with the following results shown in Table XXII, below:

TABLE XXII

| Material | BD-72B | Adhesive Composition of the Present Invention |
|---|---|---|
| Lap shear strength (psi) | 560 | 550 |
| Failure Mode (FM) | Cohesive (CF) | Fiber tear (FT) |

The fifth comparative test compared the performance of the respective adhesive compositions with SMC members. Specifically, a 7 day water immersion with a 1.5 hour recovery test was performed, with the following results shown in Table XXIII, below:

TABLE XXIII

| Material | BD-72B | Adhesive Composition of the Present Invention |
|---|---|---|
| Lap shear strength (psi) | 568 | 616 |
| Failure Mode (FM) | Cohesive (CF) | Fiber tear (FT) |

The sixth comparative test compared the performance of the respective adhesive compositions with SMC members. Specifically, a lap shear strength test under ambient conditions was performed, with the following results shown in Table XXIV, below:

TABLE XXIV

| Material | BD-72B | Adhesive Composition of the Present Invention |
|---|---|---|
| Lap shear strength (psi) | 732 | 907 |
| Failure Mode (FM) | Adhesive/Fiber Tear (AF) | Fiber tear (FT) |

As the results in Tables XVIII–XXIV illustrate, the adhesive compositions of the present invention exhibit comparable or superior lap shear strength as compared to conventional two-component epoxy adhesive compositions. Additionally, the adhesive compositions of the present invention exhibit more preferable failure mode characteristics as compared to conventional two- component epoxy adhesive compositions.

The seventh comparative test compared the performance of the respective adhesive compositions with SMC members. Specifically, a tensile strength test under ambient conditions was performed, with the following results shown in Table XXV, below:

TABLE XXV

| Material | BD-72B | Adhesive Composition of the Present Invention |
|---|---|---|
| Tensile strength (psi) | 1393 | 1112 |
| Elongation (%) (ASTM D-638) | 3.88 | 15.78 |
| Young's Modulus (ksi) | 67.2 | 35.4 |
| T-Peel strength (pli) | 25.2 | 26.7 |

As the results in Table XXV illustrate, the adhesive compositions of the present invention exhibit comparable or superior elongation as compared to conventional two-component epoxy adhesive compositions. Additionally, the adhesive compositions of the present invention exhibit lower modulus as compared to conventional two-component epoxy adhesive compositions. The Young's modulus value as shown in Table XXV and referred to throughout this application is recorded in kilopounds per square inch (ksi); however, these values can be converted to mega pascals using a conversion factor of 0.145 ksi=1 Mpa.

Additional tests were conducted to determine the performance of the adhesive compositions of the present invention at varying resin/curative ratios with respect to different substrates. The curing conditions were as follows: for non-metallic substrates, testing was commenced after a curing period of 30 minutes at room temperature (i.e., 76° F.); and for metallic substrates, testing was commenced after a curing period of 20 minutes at 340° F. (i.e., metal temperature).

The substrate samples were obtained from ACT Laboratories (Hillsdale, Mich.). The substrates were designated as follows: (1) HDG70G70U (hot-dipped, galvanized zinc), lot # 20521214; (2) ALM6111 (aluminum alloy), lot # 20620114; (3) BD SMC (sheet molded compound), lot # 3-02; and (4) EZG60G60E60 (electro-galvanized zinc), lot # 20521214.

The abbreviations used for the various failure modes (FM's) are FT (% fiber tear), CF (cohesive failure), and AF (adhesive failure).

The first comparative test compared the performance of the various substrates with various epoxy resin/epoxy curative ratios of the adhesive composition of the present invention. Specifically, lap shear strength (LSS) at room temperature was compared, with the following results shown in Table XXVI, below:

TABLE XXVI

| Resin/Epoxy Curing Agent Ratio | HD70G70GU | | Al 6111 | | BD SMC | | EG60G60E | |
|---|---|---|---|---|---|---|---|---|
| | LSS (psi) | FM (% CF) | LSS (psi) | FM (% CF) | LSS (psi) | FM (% CF/AF) | LSS (psi) | FM (% CF/AF) |
| 40/60 | 837 | 100 | 677 | 100 | 1134 | 10% FT/ 90% AF | 783 | 85% CF/ 15% AF |
| 50/50 | 1431 | 100 | 1374 | 100 | 1196 | 100% FT | 1468 | 100 |
| 60/40 | 1710 | 100 | 1704 | 100 | 1320 | 80% CF/ 20% AF | 1841 | 100 |

The second comparative test compared the performance of the various metallic substrates with various epoxy resin/epoxy curative ratios of the adhesive composition of the present invention. Specifically, T-peel strength at room temperature was compared, with the following results shown in Table XXVII, below:

TABLE XXVII

| Resin/<br>Epoxy<br>Curing<br>Agent<br>Ratio | HD70G70GU | | AI 6111 | | EG60G60E | |
|---|---|---|---|---|---|---|
| | LSS (psi) | FM (% CF) | LSS (psi) | FM (% CF) | LSS (psi) | FM (% CF) |
| 40/60 | 23 | 100 | 16 | 100 | 14 | 48% CF/52% AF |
| 50/50 | 27 | 100 | 18 | 100 | 24 | 100 |
| 60/40 | 29 | 100 | 19 | 100 | 28 | 100 |

The third comparative compared the performance of the various substrates with various epoxy resin/epoxy curative ratios of the adhesive composition of the present invention. Specifically, lap sheer strength after water immersion was compared, with the following results shown in Table XXVIII, below. The cure condition was 30 minutes at room temperature (for non-metallic substrates) or 20 minutes at 340° F. (i.e., metal temperature) (for metallic substrates) and the age condition was 24 hours at room temperature plus immersion for 72 hours in 55° C. (130° F.) water plus 24 hours at room temperature (i.e., 25° C. and 55% (+/−5%) relative humidity)

TABLE XXVIII

| Resin/Epoxy Curing Agent Ratio | | LSS (psi) | FM |
|---|---|---|---|
| 40/60 | Sample 1 | 457 | CF |
| | Sample 2 | 432 | CF |
| | Sample 3 | 448 | 10% FT/100% CF |
| | Average | 446 | |
| 50/50 | Sample 1 | 894 | FT |
| | Sample 2 | 1076 | 85% FT/15% CF |
| | Sample 3 | 970 | 85% FT/15% CF |
| | Average | 980 | |
| 60/40 | Sample 1 | 794 | FT |
| | Sample 2 | 734 | FT |
| | Sample 3 | 909 | 20% AF/10% CF/70% FT |
| | Average | 812 | |

Additional testing was performed to evaluate the performance of the adhesive compositions of the present invention with respect to various epoxy resin/epoxy curative ratios. Specifically, tensile strength, elongation at break, and modulus were evaluated, with the following results shown in Table XXIX, below:

TABLE XXIX

| Resin/Epoxy Curing Agent Ratio | Tensile Strength (psi) | Elongation at break (%) | Young's Modulus (ksi) |
|---|---|---|---|
| 40/60 | 700 +/− 100 | 45 +/− 6 | 2.9 +/− 1 |
| 50/50 | 1710 +/− 200 | 25 +/− 5 | 27 +/− 13 |
| 60/40 | 2310 +/− 300 | 10 +/− 5 | 45 +/− 15 |

In accordance with one embodiment of the present invention, the adhesive compositions of the present invention have a tensile strength of about 600 psi or greater. In accordance with another embodiment of the present invention, the adhesive compositions have a tensile strength of about 700 psi or greater. In accordance with still another embodiment of the present invention, the adhesive compositions have a tensile strength of about 800 psi or greater. In accordance with still yet another embodiment of the present invention, the adhesive compositions have a tensile strength of about 1510 psi or greater. In accordance with a further embodiment of the present invention, the adhesive compositions have a tensile strength of about 1710 psi or greater. In accordance with a still further embodiment of the present invention, the adhesive compositions have a tensile strength of about 1910 psi or greater. In accordance with an additional embodiment of the present invention, the adhesive compositions have a tensile strength of about 2010 psi or greater. In accordance with a still additional embodiment of the present invention, the adhesive compositions have a tensile strength of about 2310 psi or greater. In accordance with still yet another embodiment of the present invention, the adhesive compositions have a tensile strength of about 2610 psi or greater.

In accordance with a preferred embodiment of the present invention, the adhesive compositions of the present invention have a tensile strength in the range of about 600 psi to about 2610 psi. In accordance with another preferred embodiment of the present invention, the adhesive compositions have a tensile strength in the range of about 700 psi to about 2310 psi. In accordance with still another embodiment of the present invention, the adhesive compositions of the present invention have a tensile strength in the range of about 800 psi to about 2010 psi. In accordance with still yet another embodiment of the present invention, the adhesive compositions have a tensile strength in the range of about 1510 psi to about 1910 psi.

In accordance with one embodiment of the present invention, the adhesive compositions of the present invention have an elongation at break of about 5% or greater. In accordance with another embodiment of the present invention, the adhesive compositions have an elongation at break of about 10% or greater. In accordance with still another embodiment of the present invention, the adhesive compositions have an elongation at break of about 15% or greater. In accordance with still yet another embodiment of the present invention, the adhesive compositions have an elongation at break of about 20% or greater. In accordance with a further embodiment of the present invention, the adhesive compositions have an elongation at break of about 25% or greater. In accordance with a still further embodiment of the present invention, the adhesive compositions have an elongation at break of about 30% or greater. In accordance with an additional embodiment of the present invention, the adhesive compositions have an elongation at break of about 39% or greater. In accordance with a still additional embodiment of the present invention, the adhesive compositions have an elongation at break of about 45% or greater. In accordance with still yet another embodiment of the present invention, the adhesive compositions have an elongation at break of about 51% or greater.

In accordance with a preferred embodiment of the present invention, the adhesive compositions of the present invention have an elongation at break in the range of about 5% to about 51%. In accordance with another preferred embodiment of the present invention, the adhesive compositions have an elongation at break in the range of about 10% to about 45%. In accordance with still another embodiment of the present invention, the adhesive compositions of the present invention have an elongation at break in the range of about 15% to about 39%. In accordance with still yet another embodiment of the present invention, the adhesive compositions have an elongation at break in the range of about 20% to about 30%.

In accordance with one embodiment of the present invention, the adhesive compositions of the present invention have a Young's modulus of about 1.9 ksi or greater. In accordance with another embodiment of the present invention, the adhesive compositions have a Young's modulus of about 2.9 ksi or greater. In accordance with still another embodiment of the present invention, the adhesive compositions have a Young's modulus of about 3.9 ksi or greater. In accordance with still yet another embodiment of the present invention, the adhesive compositions have a Young's modulus of about 14 ksi or greater. In accordance with a further embodiment of the present invention, the adhesive compositions have a Young's modulus of about 27 ksi or greater. In accordance with a still further embodiment of the present invention, the adhesive compositions have a Young's modulus of about 30 ksi or greater. In accordance with an additional embodiment of the present invention, the adhesive compositions have a Young's modulus of about 40 ksi or greater. In accordance with a still additional embodiment of the present invention, the adhesive compositions have a Young's modulus of about 45 ksi or greater. In accordance with still yet another embodiment of the present invention, the adhesive compositions have a Young's modulus of about 60 ksi or greater.

In accordance with a preferred embodiment of the present invention, the adhesive compositions of the present invention have a Young's modulus in the range of about 1.9 ksi to about 60 ksi. In accordance with another preferred embodiment of the present invention, the adhesive compositions have a Young's modulus in the range of about 2.9 ksi to about 45 ksi. In accordance with still another embodiment of the present invention, the adhesive compositions of the present invention have a Young's modulus in the range of about 3.9 ksi to about 40 ksi. In accordance with still yet another embodiment of the present invention, the adhesive compositions have a Young's modulus in the range of about 14 ksi to about 30 ksi.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A two-component epoxy adhesive composition, comprising:
    an epoxy resin component, comprising:
        at least one epoxy resin; and
        at least one flexibilizer present in the range of about 12 to about 16 weight percent, based on the total weight of the epoxy resin component, wherein the flexibilizer of the epoxy resin component is comprised of a material selected from the group consisting of a reaction product of epichlorohydrin and polypropylene glycol, a high functionality acrylic monomer, a glycidyl ether of an alkyl phenol, and combinations thereof; and
    an epoxy curative component, comprising:
        at least one curing agent; and
        at least one flexibilizer present in the range of about 55 to about 65 weight percent, based on the total weight of the epoxy curative component, wherein the flexibilizer of the epoxy curative component is comprised of a material selected from the group consisting of an amine terminated butadiene nitrile copolymer, an aliphatic amine adduct, a polyamide adduct, a phenoxy alcohol, and combinations thereof.

2. The invention according to claim 1, wherein the at least one flexibilizer in the epoxy resin component is present in the range of about 13 to about 15 weight percent, based on the total weight of the epoxy resin component.

3. The invention according to claim 1, wherein the at least one flexibilizer in the epoxy resin component is present in an amount of about 14 weight percent, based on the total weight of the epoxy resin component.

4. The invention according to claim 1, wherein the at least one flexibilizer in the epoxy curative component is present in the range of about 57 to about 63 weight percent, based on the total weight of the epoxy curative component.

5. The invention according to claim 1, wherein the at least one flexibilizer in the epoxy curative component is present in an amount of about 60 weight percent, based on the total weight of the epoxy curative component.

6. The invention according to claim 1, wherein the epoxy resin component is present in the range of about 40 to 60 weight percent, based on the total combined weight of the epoxy resin component and the epoxy curative component.

7. The invention according to claim 1, wherein the epoxy curative component is present in the range of about 40 to 60 weight percent, based on the total combined weight of the epoxy resin component and the epoxy curative component.

8. The invention according to claim 1, wherein upon curing, the epoxy adhesive composition has an elongation at break in the range of about 10 percent to about 45 percent.

9. The invention according to claim 1, wherein upon curing, the epoxy adhesive composition has an elongation at break in an amount of about 25 percent.

10. The invention according to claim 1, wherein upon curing, the epoxy adhesive composition has a Young's modulus in the range of about 20 Mpa to about 310 Mpa.

11. The invention according to claim 1, wherein upon curing, the epoxy adhesive composition has a Young's modulus in an amount of about 186.2 Mpa.

12. The invention according to claim 1, wherein upon curing, the epoxy adhesive composition has a tensile strength in the range of about 700 psi to about 2310 psi.

13. The invention according to claim 1, wherein upon curing, the epoxy adhesive composition has a tensile strength in an amount of about 1710 psi.

14. The invention according to claim 1, wherein the reaction product of epichlorohydrin and polypropylene glycol is present in the range of about 4 to about 10 weight percent, based on the total weight of the epoxy resin component.

15. The invention according to claim 1, wherein the reaction product of epichlorohydrin and polypropylene glycol is present in the range of about 4 to about 6 weight percent, based on the total weight of the epoxy resin component.

16. The invention according to claim 1, wherein the reaction product of epichlorohydrin and polypropylene glycol is present in the range of about 4 to about 5 weight percent, based on the total weight of the epoxy resin component.

17. The invention according to claim 1, wherein the high functionality acrylic monomer is present in the range of about 1 to about 10 weight percent, based on the total weight of the epoxy resin component.

18. The invention according to claim 1, wherein the high functionality acrylic monomer is present in the range of about 2 to about 6 weight percent, based on the total weight of the epoxy resin component.

19. The invention according to claim 1, wherein the high functionality acrylic monomer is present in the range of about 4 to about 6 weight percent, based on the total weight of the epoxy resin component.

20. The invention according to claim 1, wherein the glycidyl ether of an alkyl phenol is present in the range of about 4 to about 10 weight percent, based on the total weight of the epoxy resin component.

21. The invention according to claim 1, wherein the glycidyl ether of an alkyl phenol is present in the range of about 4 to about 6 weight percent, based on the total weight of the epoxy resin component.

22. The invention according to claim 1, wherein the glycidyl ether of an alkyl phenol is present in the range of about 4 to about 5 weight percent, based on the total weight of the epoxy resin component.

23. The invention according to claim 1, wherein the amine terminated butadiene nitrile copolymer is present in the range of about 10 to about 30 weight percent, based on the total weight of the epoxy curative component.

24. The invention according to claim 1, wherein the amine terminated butadiene nitrile copolymer is present in the range of about 20 to about 30 weight percent, based on the total weight of the epoxy curative component.

25. The invention according to claim 1, wherein the amine terminated butadiene nitrile copolymer is present in the range of about 24 to about 28 weight percent, based on the total weight of the epoxy curative component.

26. The invention according to claim 1, wherein the aliphatic amine adduct is present in the range of about 5 to about 10 weight percent, based on the total weight of the epoxy curative component.

27. The invention according to claim 1, wherein the aliphatic amine adduct is present in the range of about 6 to about 10 weight percent, based on the total weight of the epoxy curative component.

28. The invention according to claim 1, wherein the aliphatic amine adduct is present in the range of about 6 to about 9 weight percent, based on the total weight of the epoxy curative component.

29. The invention according to claim 1, wherein the polyamide adduct is present in the range of about 10 to about 15 weight percent, based on the total weight of the epoxy curative component.

30. The invention according to claim 1, wherein the polyamide adduct is present in the range of about 13 to about 15 weight percent, based on the total weight of the epoxy curative component.

31. The invention according to claim 1, wherein the polyamide adduct is present in the range of about 14 to about 15 weight percent, based on the total weight of the epoxy curative component.

32. The invention according to claim 1, wherein the phenoxy alcohol is present in the range of about 10 to about 15 weight percent, based on the total weight of the epoxy curative component.

33. The invention according to claim 1, wherein the phenoxy alcohol is present in the range of about 10 to about 13 weight percent, based on the total weight of the epoxy curative component.

34. The invention according to claim 1, wherein the phenoxy alcohol is present in the range of about 11 to about 13 weight percent, based on the total weight of the epoxy curative component.

35. The invention according to claim 1, wherein the epoxy resin component optionally includes a material selected from the group consisting of coupling agents, pigments, fillers, rheological agents, and combinations thereof.

36. The invention according to claim 1, wherein the epoxy curative component optionally includes a material selected from the group consisting of fillers, rheological agents, and combinations thereof.

37. A two-component epoxy adhesive composition, comprising:
an epoxy resin component, comprising:
at least one epoxy resin; and
at least one flexibilizer present in the range of about 13 to about 15 weight percent, based on the total weight of the epoxy resin component wherein the flexibilizer of the epoxy resin component is comprised of a material selected from the group consisting of a reaction product of epichlorohydrin and polypropylene glycol, a high functionality acrylic monomer, a glycidyl ether of an alkyl phenol, and combinations thereof; and
an epoxy curative component, comprising:
at least one curing agent; and
at least one flexibilizer present in the range of about 57 to about 63 weight percent, based on the total weight of the epoxy curative component, wherein the flexibilizer of the epoxy curative component is comprised of a material selected from the group consisting of an amine terminated butadiene nitrile copolymer, an aliphatic amine adduct, a polyamide adduct, a phenoxy alcohol, and combinations thereof.

38. The invention according to claim 37, wherein the epoxy resin component is present in the range of about 40 to 60 weight percent, based on the total combined weight of the epoxy resin component and the epoxy curative component.

39. The invention according to claim 37, wherein the epoxy curative component is present in the range of about 40 to 60 weight percent, based on the total combined weight of the epoxy resin component and the epoxy curative component.

40. The invention according to claim 37, wherein upon curing, the epoxy adhesive composition has an elongation at break in the range of about 10 percent to about 45 percent.

41. The invention according to claim 37, wherein upon curing, the epoxy adhesive composition has a Young's modulus in the range of about 20 Mpa to about 310 Mpa.

42. The invention according to claim 37, wherein upon curing, the epoxy adhesive composition has a tensile strength in the range of about 700 psi to about 2310 psi.

43. The invention according to claim 37, wherein the reaction product of epichlorohydrin and polypropylene glycol is present in the, range of about 4 to about 10 weight percent, based on the total weight of the epoxy resin component.

44. The invention according to claim 37, wherein the high functionality acrylic monomer is present in the range of about 1 to about 10 weight percent, based on the total weight of the epoxy resin component.

45. The invention according to claim 37, wherein the glycidyl ether of an alkyl phenol is present in the range of about 4 to about 10 weight percent, based on the total weight of the epoxy resin component.

46. The invention according to claim 37, wherein the amine terminated butadiene nitrile copolymer is present in the range of about 10 to about 30 weight percent, based on the total weight of the epoxy curative component.

47. The invention according to claim 37, wherein the aliphatic amine adduct is present in the range of about 5 to about 10 weight percent, based on the total weight of the epoxy curative component.

48. The invention according to claim 37, wherein the polyamide adduct is present in the range of about 10 to about 15 weight percent, based on the total weight of the epoxy curative component.

49. The invention according to claim 37, wherein the phenoxy alcohol is present in the range of about 10 to about 15 weight percent, based on the total weight of the epoxy curative component.

50. A two-component epoxy adhesive composition, comprising:
an epoxy resin component, comprising:
at least one epoxy resin; and
at least one flexibilizer present in amount equal to about 14 weight percent, based on the total weight of the epoxy resin component wherein the flexibilizer of the epoxy resin component is comprised of a material selected from the group consisting of a reaction product of epichlorohydrin and polypropylene glycol, a high functionality acrylic monomer, a glycidyl ether of an alkyl phenol, and combinations thereof; and
an epoxy curative component, comprising:
at least one curing agent; and
at least one flexibilizer present in an amount equal to about 60 weight percent, based on the total weight of the epoxy curative component, wherein the flexibilizer of the epoxy curative component is comprised of a material selected from the group consisting of an amine terminated butadiene nitrile copolymer, an aliphatic amine adduct, a polyamide adduct, a phenoxy alcohol, and combinations thereof.

51. The invention according to claim 50, wherein the epoxy resin component is present in the range of about 40 to 60 weight percent, based on the total combined weight of the epoxy resin component and the epoxy curative component.

52. The invention according to claim 50, wherein the epoxy curative component is present in the range of about 40 to 60 weight percent, based on the total combined weight of the epoxy resin component and the epoxy curative component.

53. The invention according to claim 50, wherein upon curing, the epoxy adhesive composition has an elongation at break in the range of about 10 percent to about 45 percent.

54. The invention according to claim 50, wherein upon curing, the epoxy adhesive composition has a Young's modulus in the range of about 20 Mpa to about 310 Mpa.

55. The invention according to claim 50, wherein upon curing, the epoxy adhesive composition has a tensile strength in the range of about 700 psi to about 2310 psi.

56. The invention according to claim 50, wherein the reaction product of epichlorohydrin and polypropylene glycol is present in the range of about 4 to about 10 weight percent, based on the total weight of the epoxy resin component.

57. The invention according to claim 50, wherein the high functionality acrylic monomer is present in the range of about 1 to about 10 weight percent, based on the total weight of the epoxy resin component.

58. The invention according to claim 50, wherein the glycidyl ether of an alkyl phenol is present in the range of about 4 to about 10 weight percent, based on the total weight of the epoxy resin component.

59. The invention according to claim 50, wherein the amine terminated butadiene nitrile copolymer is present in the range of about 10 to about 30 weight percent, based on the total weight of the epoxy curative component.

60. The invention according to claim 50, wherein the aliphatic amine adduct is present in the range of about 5 to about 10 weight percent, based on the total weight of the epoxy curative component.

61. The invention according to claim 50, wherein the polyamide adduct is present in the range of about 10 to about 15 weight percent, based on the total weight of the epoxy curative component.

62. The invention according to claim 50, wherein the phenoxy alcohol is present in the range of about 10 to about 15 weight percent, based on the total weight of the epoxy curative component.

63. An automotive exterior panel system, comprising:
a first panel member;
a second panel member; and
a two-component epoxy adhesive composition disposed therebetween, the composition comprising:
an epoxy resin component, comprising:
at least one epoxy resin; and
at least one flexibilizer present in the range of about 12 to about 16 weight percent, based on the total weight of the epoxy resin component, wherein the flexibilizer of the epoxy resin component is comprised of a material selected from the group consisting of a reaction product of epichlorohydrin and polypropylene glycol, a high functionality acrylic monomer, a glycidyl ether of an alkyl phenol, and combinations thereof; and
an epoxy curative component, comprising:
at least one curing agent; and
at least one flexibilizer present in the range of about 55 to about 65 weight percent, based on the total weight of the epoxy curative component.

64. The invention according to claim 63, wherein the first panel member is comprised of a material selected from the group consisting of metals, thermosets, and combinations thereof.

65. The invention according to claim 63, wherein the second panel member is comprised of a material selected from the group consisting of metals, thermosets, and combinations thereof.

66. The invention according to claim 63, wherein upon curing, the epoxy adhesive composition has an elongation at break in the range of about 10 percent to about 45 percent.

67. The invention according to claim 63, wherein upon curing, the epoxy adhesive composition has a Young's modulus in the range of about 20 Mpa to about 310 Mpa.

68. The invention according to claim 63, wherein upon curing, the epoxy adhesive composition has a tensile strength in the range of about 700 psi to about 2310 psi.

69. The invention according to claim 63, wherein the reaction product of epichlorohydrin and polypropylene glycol is present in the range of about 4 to about 10 weight percent, based on the total weight of the epoxy resin component.

70. The invention according to claim 63, wherein the high functionality acrylic monomer is present in the range of about 1 to about 10 weight percent, based on the total weight of the epoxy resin component.

71. The invention according to claim 63, wherein the glycidyl ether of an alkyl phenol is present in the range of about 4 to about 10 weight percent, based on the total weight of the epoxy resin component.

72. The invention according to claim 63, wherein the flexibilizer of the epoxy curative component is comprised of a material selected from the group consisting of an amine terminated butadiene nitrile copolymer, an aliphatic amine adduct, a polyamide adduct, a phenoxy alcohol, and combinations thereof.

73. The invention according to claim 72, wherein the amine terminated butadiene nitrile copolymer is present in the range of about 10 to about 30 weight percent, based on the total weight of the epoxy curative component.

74. The invention according to claim 72, wherein the aliphatic amine adduct is present in the range of about 5 to about 10 weight percent, based on the total weight of the epoxy curative component.

75. The invention according to claim 72, wherein the polyamide adduct is present in the range of about 10 to about 15 weight percent, based on the total weight of the epoxy curative component.

76. The invention according to claim 72, wherein the phenoxy alcohol is present in the range of about 10 to about 15 weight percent, based on the total weight of the epoxy curative component.

77. A method for forming an automotive exterior panel system, comprising the steps of:
   providing a first panel member;
   providing a second panel member; and
   applying a two-component epoxy adhesive composition therebetween, the composition comprising:
      an epoxy resin component, comprising:
         at least one epoxy resin; and
         at least one flexibilizer present in the range of about 12 to about 16 weight percent, based on the total weight of the epoxy resin component, wherein the flexibilizer of the epoxy resin component is comprised of a material selected from the group consisting of a reaction product of epichlorohydrin and polypropylene glycol, a high functionality acrylic monomer, a glycidyl ether of an alkyl phenol, and combinations thereof; and
      an epoxy curative component, comprising:
         at least one curing agent; and
         at least one flexibilizer present in the range of about 55 to about 65 weight percent, based on the total weight of the epoxy curative component.

78. The invention according to claim 77, wherein the first panel member is comprised of a material selected from the group consisting of metals, thermosets, and combinations thereof.

79. The invention according to claim 77, wherein the second panel member is comprised of a material selected from the group consisting of metals, thermosets, and combinations thereof.

80. The invention according to claim 77, wherein upon curing, the epoxy adhesive composition has an elongation at break in the range of about 10 percent to about 45 percent.

81. The invention according to claim 77, wherein upon curing, the epoxy adhesive composition has a Young's modulus in the range of about 20 Mpa to about 310 Mpa.

82. The invention according to claim 77, wherein upon curing, the epoxy adhesive composition has a tensile strength in the range of about 700 psi to about 2310 psi.

83. The invention according to claim 77, wherein the reaction product of epichlorohydrin and polypropylene glycol is present in the range of about 4 to about 10 weight percent, based on the total weight of the epoxy resin component.

84. The invention according to claim 77, wherein the high functionality acrylic monomer is present in the range of about 1 to about 10 weight percent, based on the total weight of the epoxy resin component.

85. The invention according to claim 77, wherein the glycidyl ether of an alkyl phenol is present in the range of about 4 to about 10 weight percent, based on the total weight of the epoxy resin component.

86. The invention according to claim 77, wherein the flexibilizer of the epoxy curative component is comprised of a material selected from the group consisting of an amine terminated butadiene nitrile copolymer, an aliphatic amine adduct, a polyamide adduct, a phenoxy alcohol, and combinations thereof.

87. The invention according to claim 86, wherein the amine terminated butadiene nitrile copolymer is present in the range of about 10 to about 30 weight percent, based on the total weight of the epoxy curative component.

88. The invention according to claim 86, wherein the aliphatic amine adduct is present in the range of about 5 to about 10 weight percent, based on the total weight of the epoxy curative component.

89. The invention according to claim 86, wherein the polyamide adduct is present in the range of about 10 to about 15 weight percent, based on the total weight of the epoxy curative component.

90. The invention according to claim 86, wherein the phenoxy alcohol is present in the range of about 10 to about 15 weight percent, based on the total weight of the epoxy curative component.

* * * * *

UNITED STATES PATENT AND TRADEMARK OFFICE
CERTIFICATE OF CORRECTION

PATENT NO. : 7,157,143 B2
APPLICATION NO. : 10/395783
DATED : January 2, 2007
INVENTOR(S) : Jihong Kye It is certified that error appears in the above-identified patent and that said Letters Patent is hereby corrected as shown below:

Column 32, line 57, the semicolon should be deleted after the word "the".

Column 33, line 23, a comma should be added after the word "component".

Signed and Sealed this

Third Day of April, 2007

JON W. DUDAS
*Director of the United States Patent and Trademark Office*